US012162033B2

(12) United States Patent
Burns

(10) Patent No.: US 12,162,033 B2
(45) Date of Patent: Dec. 10, 2024

(54) COATING APPLICATOR AND COATING APPLICATION SYSTEM

(71) Applicant: Rooftop Research, LLC, New Wilmington, PA (US)

(72) Inventor: Robert S. Burns, New Wilmington, PA (US)

(73) Assignee: Rooftop Research, LLC, New Wilmington, PA (US)

( * ) Notice: Subject to any disclaimer, the term of this patent is extended or adjusted under 35 U.S.C. 154(b) by 0 days.

(21) Appl. No.: 17/854,417

(22) Filed: Jun. 30, 2022

(65) Prior Publication Data

US 2022/0323987 A1 Oct. 13, 2022

Related U.S. Application Data

(63) Continuation of application No. 16/821,268, filed on Mar. 17, 2020, now Pat. No. 11,376,624, which is a continuation of application No. 15/928,584, filed on Mar. 22, 2018, now Pat. No. 10,646,895, which is a continuation-in-part of application No. 15/589,459, filed on May 8, 2017, now abandoned, which is a continuation of application No. 14/197,800, filed on Mar. 5, 2014, now Pat. No. 9,675,993.

(51) Int. Cl.

| | |
|---|---|
| ***A46B 15/00*** | (2006.01) |
| ***B05C 1/08*** | (2006.01) |
| ***B05C 17/00*** | (2006.01) |
| ***B05C 17/02*** | (2006.01) |
| ***B05C 17/035*** | (2006.01) |
| ***E04D 15/07*** | (2006.01) |

(52) U.S. Cl.
CPC ........ *B05C 17/0212* (2013.01); *B05C 1/0808* (2013.01); *B05C 17/002* (2013.01); *B05C 17/0205* (2013.01); *B05C 17/0217* (2013.01); *B05C 17/0232* (2013.01); *B05C 17/0235* (2013.01); *B05C 17/0352* (2013.01); *E04D 15/07* (2013.01); *B05C 17/022* (2013.01)

(58) Field of Classification Search
CPC .............. B05C 17/0212; B05C 17/002; B05C 17/0205; B05C 17/0217; B05C 17/0232; B05C 17/0235; B05C 17/0352; B05C 17/00566; B05C 1/0808; B05C 1/0813; E04F 15/07; E04D 15/07
See application file for complete search history.

(56) References Cited

U.S. PATENT DOCUMENTS

| | | | |
|---|---|---|---|
| 2,538,241 | A | 1/1951 | Guimond |
| 2,823,402 | A | 2/1958 | Phillips |
| 2,929,089 | A | 3/1960 | Nall |

(Continued)

FOREIGN PATENT DOCUMENTS

| | | |
|---|---|---|
| FR | 1493549 | 9/1967 |

*Primary Examiner* — Jennifer C Chiang
(74) *Attorney, Agent, or Firm* — Dority & Manning, P.A.

(57) ABSTRACT

A coating applicator that applies a coating or liquid to a variety of different substrates having different contoured surfaces is disclosed. A coating applicator of the present disclosure is able to reach, contact, and cover the entirety of a contoured substrate. In this manner, the coating applicator is able to transfer a coating to the entirety of the contoured substrate. Additionally, fluid application systems of the present disclosure include systems for advantageously providing a fluid to a fluid applicator.

15 Claims, 32 Drawing Sheets

(56) References Cited

U.S. PATENT DOCUMENTS

| | | | |
|---|---|---|---|
| 2,955,310 | A | 10/1960 | Wichern |
| 3,089,180 | A | 5/1963 | Humphrey |
| 3,331,093 | A | 7/1967 | Mayden |
| 3,332,131 | A | 7/1967 | Weiler |
| 3,662,422 | A | 5/1972 | Christensen et al. |
| 3,702,739 | A | 11/1972 | Rentfrow |
| 3,714,674 | A | 2/1973 | Simoncioni |
| 3,717,899 | A | 2/1973 | Gardner et al. |
| 3,752,109 | A | 8/1973 | Seiple |
| 3,970,396 | A | 7/1976 | Brady |
| 4,573,233 | A | 3/1986 | Stoop |
| 5,198,036 | A | 3/1993 | Sotolongo |
| 5,410,773 | A | 5/1995 | Forkner |
| 5,611,100 | A | 3/1997 | Zigelboim et al. |
| 6,941,632 | B1 | 9/2005 | Mead et al. |
| 7,090,421 | B1 | 8/2006 | Mead et al. |
| 7,144,170 | B2 | 12/2006 | Parks et al. |
| 7,337,488 | B2 | 3/2008 | Martin |
| 7,407,336 | B2 | 8/2008 | Giacomo |
| 7,544,006 | B2 | 6/2009 | Massimi |
| D626,750 | S | 11/2010 | Armstrong |
| 8,251,603 | B2 | 8/2012 | Kott et al. |
| 8,888,670 | B2 | 11/2014 | Grubbs |
| 9,205,447 | B2 | 12/2015 | Wilson |
| 9,266,139 | B2 * | 2/2016 | Bruggeman ........ B05C 17/0217 |
| 9,498,792 | B2 | 11/2016 | Miller et al. |
| 9,566,594 | B2 * | 2/2017 | Galvin .................... B05B 9/007 |
| 10,081,032 | B2 * | 9/2018 | Rundo .................... B05C 21/00 |
| 2004/0111818 | A1 | 6/2004 | Ma |
| 2005/0050665 | A1 | 3/2005 | Mitchell |
| 2006/0099025 | A1 | 5/2006 | Hann |
| 2011/0097485 | A1 | 4/2011 | Breeden et al. |
| 2020/0062574 | A1 | 2/2020 | Burns |

* cited by examiner 204
120
126
202
124
122
130
120
150
152
204
126
202
124
200

122
140
142
130
120
202
124
122, 130

120
204
126

124
202
122, 130

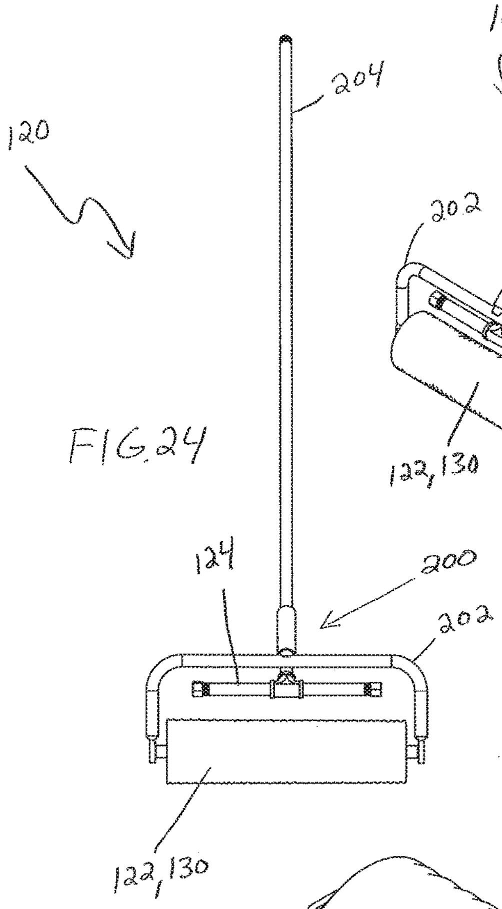
FIG.24
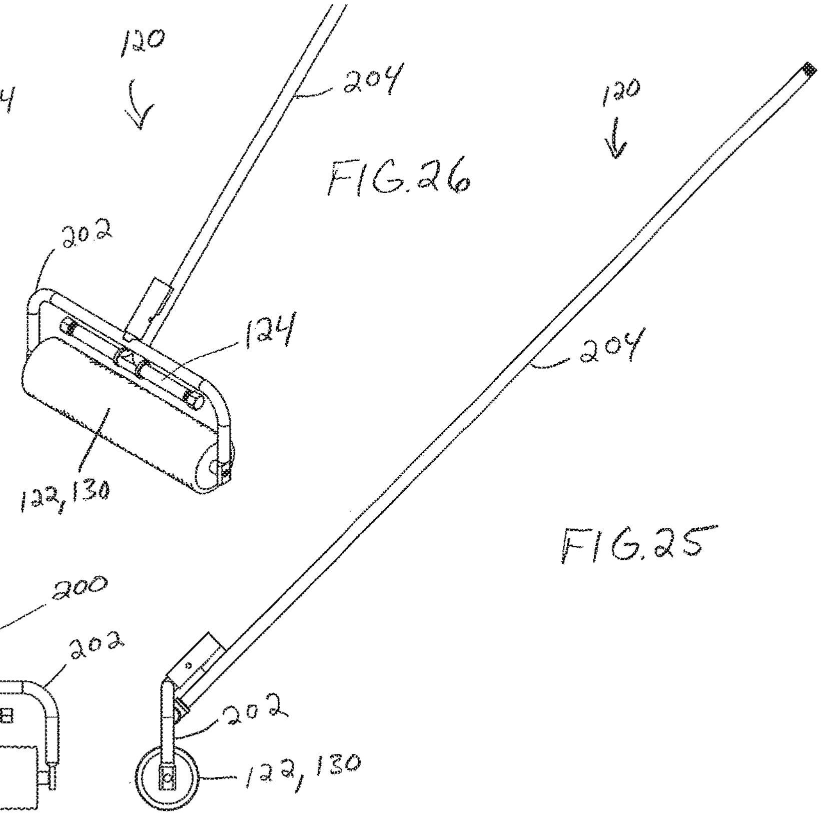
FIG.26
FIG.25
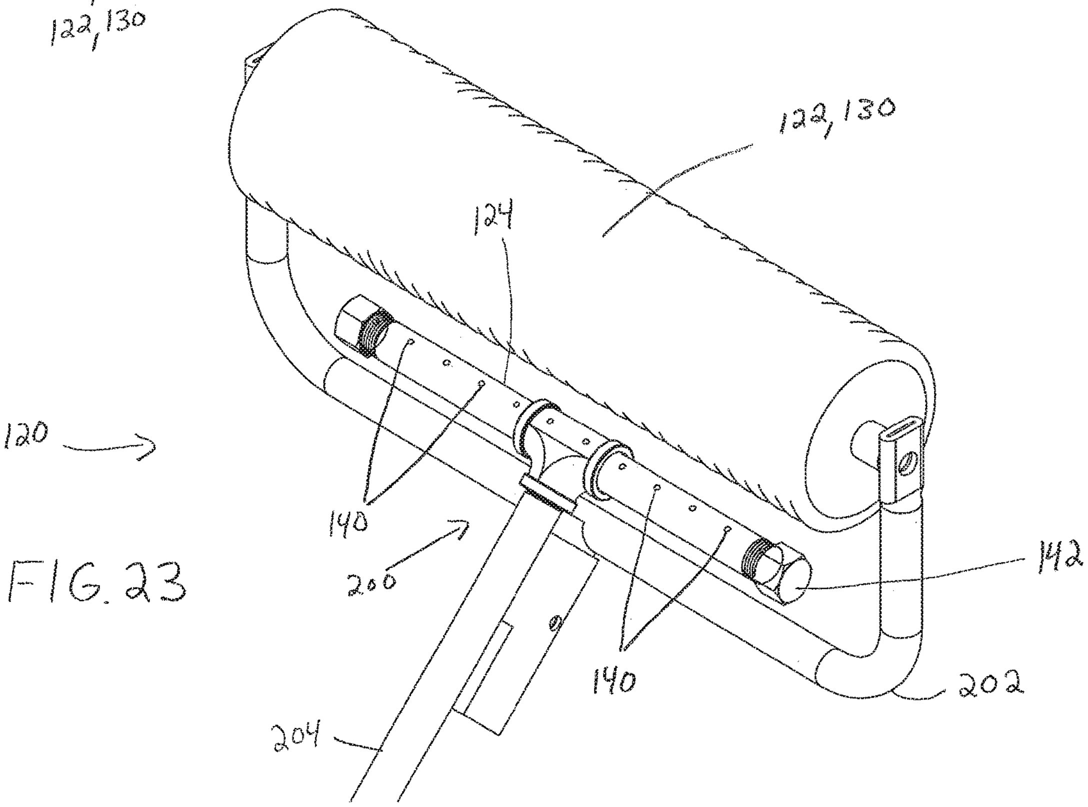
FIG.23

1" STREAM SPACING CORRELATES TO 1" HORIZONTAL SURFACE

.61" STREAM SPACING CORRELATES TO 1" ANGLED SURFACE

1" ON THE ANGLED SURFACE IS A FRACTION OF AN INCH ON THE HORIZONTAL SURFACE

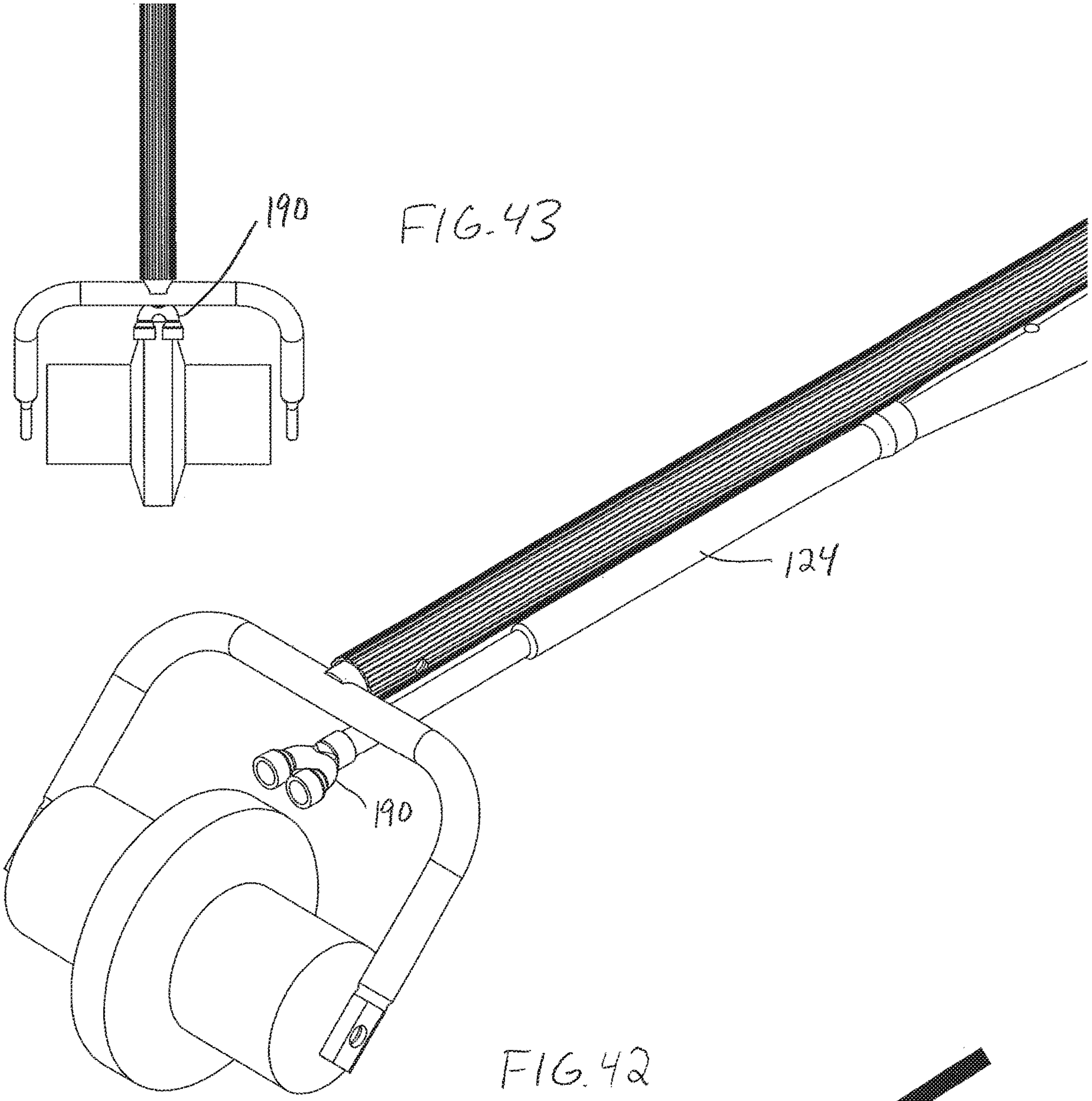
FIG. 43
FIG. 42
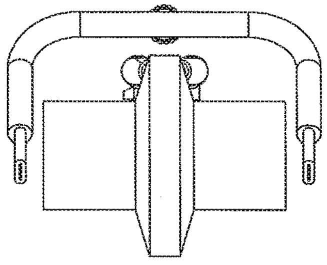
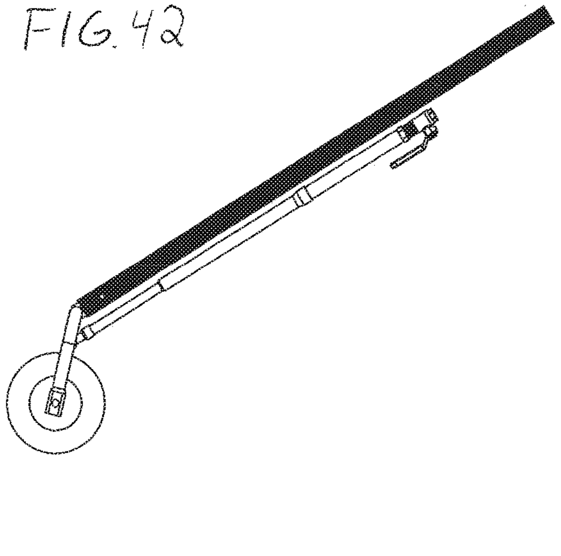

COATING APPLICATOR AND COATING APPLICATION SYSTEM

CROSS-REFERENCE TO RELATED APPLICATIONS

The present application is a continuation of and claims priority to U.S. application Ser. No. 16/821,268 entitled "Coating Applicator and Coating Application System", filed Mar. 17, 2020, which claims priority to U.S. application Ser. No. 15/928,584 entitled "Coating Applicator and Coating Application System", filed Mar. 22, 2018, which claims priority to U.S. application Ser. No. 15/589,459 entitled "Coating Applicator and Coating Application System", filed May 8, 2017, which claims priority to U.S. application Ser. No. 14/197,800 entitled "Coating Applicator and Coating Application System", filed Mar. 5, 2014, now U.S. Pat. No. 9,675,993 issued Jun. 13, 2017, the entire disclosures of which are hereby expressly incorporated by reference herein.

BACKGROUND OF THE INVENTION

1. Field of the Disclosure

The present disclosure relates generally to a fluid applicator. More particularly, the present disclosure relates to a fluid applicator and a fluid application system for applying a fluid to a substrate.

2. Description of the Related Art

Rollers are used to apply paints and other liquids to a desired surface. Rollers hold a liquid on the outer surface or nap of the roller until it is desired to apply such liquids. As a roller is placed in contact with a substrate, the liquid is transferred from the outside of the roller to the contacted substrate. However, when the substrate is channeled, corrugated, or ribbed such surface irregularities prevent the surface of the roller from contacting the substrate to be coated.

For example, a roof panel that is formed with ribs and channels will have a surface that is undulated. As a conventional roller is used with such a surface, the liquid cannot be adequately transferred from the roller to the substrate because the roller cannot contact all of the areas of the substrate or roof panel. The areas of the substrate that are not contacted by the roller do not receive the liquid. This results in many areas of the substrate being uncovered by the liquid.

To attempt to coat these uncovered areas of the substrate, the roller must be placed in awkward orientations to try to transfer the coating from the roller to the substrate. This method of application makes the process of coating a channeled surface very difficult. This process is time consuming and often it is impossible to reach all of the surfaces to be coated. Furthermore, the person maneuvering the roller is placed in danger as they attempt to orient the roller to the channeled surface.

An additional challenge that arises when applying fluids to a desired surface includes providing a continual supply of the fluid to a roller, at the application location, that will be used to transfer the fluid to the desired surface. Carrying, moving, or transporting a reservoir of fluid to an application location is often not practical.

SUMMARY OF THE INVENTION

The present disclosure provides a coating applicator that applies a coating or liquid to a variety of different substrates having different contoured surfaces. The present disclosure provides a coating applicator that is able to reach, contact, and cover the entirety of a contoured substrate. In this manner, the coating applicator is able to transfer a coating to the entirety of the contoured substrate. Additionally, fluid application systems of the present disclosure include systems for advantageously providing a fluid to a fluid applicator In accordance with an embodiment of the present disclosure, a coating applicator for applying a coating to a substrate includes a body having a first portion and a second portion, the first portion having a first diameter and the second portion having a second diameter less than the first diameter.

In one configuration, the first portion includes a first section and a second section and the second portion is between the first section and the second section. In another configuration, the body includes a third portion between the first portion and the second portion. In yet another configuration, the third portion is tapered. In one configuration, the coating applicator comprises a roller. In another configuration, the substrate has a first contoured surface and a second contoured surface different than the first contoured surface, the first portion of the coating applicator is adapted to cover the first contoured surface of the substrate and the second portion of the coating applicator is adapted to cover the second contoured surface of the substrate. In yet another configuration, the coating applicator includes a nap material removably attachable to the body of the coating applicator, the nap material adapted to receive the coating and apply the coating to the substrate. In one configuration, the nap material is transitionable between an undeformed position and a deformed position in which the nap material is adapted to variably cover the substrate.

In accordance with another embodiment of the present disclosure, a coating applicator for applying a coating to a substrate includes a body having a first portion and a second portion, the first portion having a first contoured surface and the second portion having a second contoured surface different than the first contoured surface.

In one configuration, the substrate has a first substrate contoured surface and a second substrate contoured surface different than the first substrate contoured surface, the first portion of the coating applicator is adapted to cover the first substrate contoured surface and the second portion of the coating applicator is adapted to cover the second substrate contoured surface.

In accordance with another embodiment of the present disclosure, a coating applicator for applying a coating to a substrate includes a body having a first portion, a second portion, and a third portion, the first portion having a first contoured surface, the second portion having a second contoured surface, and the third portion having a third contoured surface, the third contoured surface different than the second contoured surface and the first contoured surface, and the second contoured surface different than the first contoured surface.

In one configuration, the substrate has a first substrate contoured surface, a second substrate contoured surface different than the first substrate contoured surface, and a third substrate contoured surface different than the first substrate contoured surface and the second substrate contoured surface, the first portion of the coating applicator is adapted to cover the first substrate contoured surface, the second portion of the coating applicator is adapted to cover the second substrate contoured surface, and the third portion of the coating applicator is adapted to cover the third substrate contoured surface.

In accordance with another embodiment of the present disclosure, a coating applicator for applying a coating to a substrate having a first contoured surface and a second contoured surface different than the first contoured surface includes a body having a first portion and a second portion, the first portion having a first diameter and the second portion having a second diameter less than the first diameter, the first portion adapted to cover the first contoured surface of the substrate and the second portion adapted to cover the second contoured surface of the substrate.

In accordance with another embodiment of the present disclosure, a coating application system for applying a coating to a substrate includes a carrier; a first coating applicator for applying the coating to the substrate, the first coating applicator removably attachable to the carrier, the first coating applicator comprising a first body having a first portion and a second portion, the first portion having a first diameter and the second portion having a second diameter different than the first diameter; and a second coating applicator for applying the coating to the substrate, the second coating applicator removably attachable to the carrier, the second coating applicator comprising a second body having a third portion and a fourth portion, the third portion having a third diameter and the fourth portion having a fourth diameter different than the third diameter.

In one configuration, the first diameter of the first portion of the first coating applicator is different than the third diameter of the third portion of the second coating applicator. In another configuration, the second diameter of the second portion of the first coating applicator is different than the fourth diameter of the fourth portion of the second coating applicator. In yet another configuration, the carrier includes a movable support for transporting the carrier along the substrate. In one configuration, the movable support comprises a wheel. In another configuration, the carrier comprises a tank spreader. In yet another configuration, the carrier comprises a frame and a handle extending from the frame. In one configuration, the substrate has a first contoured surface and a second contoured surface different than the first contoured surface, the first portion of the first coating applicator is adapted to cover the first contoured surface of the substrate and the second portion of the first coating applicator is adapted to cover the second contoured surface of the substrate. In another configuration, the substrate has a first contoured surface and a second contoured surface different than the first contoured surface, the third portion of the second coating applicator is adapted to cover the first contoured surface of the substrate and the fourth portion of the second coating applicator is adapted to cover the second contoured surface of the substrate.

In accordance with another embodiment of the present disclosure, a coating application system for applying a coating to a substrate includes a carrier; a first coating applicator for applying the coating to the substrate, the first coating applicator removably attachable to the carrier, the first coating applicator comprising a first body having a first portion and a second portion, the first portion having a first contoured surface and the second portion having a second contoured surface different than the first contoured surface, and a second coating applicator for applying the coating to the substrate, the second coating applicator removably attachable to the carrier, the second coating applicator comprising a second body having a third portion and a fourth portion, the third portion having a third contoured surface and the fourth portion having a fourth contoured surface different than the third contoured surface In one configuration, the first contoured surface of the first portion of the first coating applicator is different than the third contoured surface of the third portion of the second coating applicator. In another configuration, the second contoured surface of the second portion of the first coating applicator is different than the fourth contoured surface of the fourth portion of the second coating applicator. In yet another configuration, the carrier includes a movable support for transporting the carrier along the substrate. In one configuration, the movable support comprises a wheel.

In accordance with another embodiment of the present disclosure, a coating applicator for applying a coating to a substrate includes a body having a first portion and a second portion, the first portion having a first diameter and the second portion having a second diameter less than the first diameter; and a plurality of flexible elements removably attachable to the body of the coating applicator, the plurality of flexible elements receive the coating and apply the coating to the substrate.

In one configuration, the plurality of flexible elements are transitionable between a first position in which the plurality of flexible elements contact and cover a first substrate having a first shape and a second position in which the plurality of flexible elements contact and cover a second substrate having a second shape, the second shape different than the first shape. In another configuration, the plurality of flexible elements comprise a nap. In yet another configuration, the first portion includes a first section and a second section and the second portion is between the first section and the second section. In one configuration, the body further includes a third portion between the first portion and the second portion. In another configuration, the third portion is tapered. In yet another configuration, the coating applicator comprises a roller. In one configuration, the substrate has a first contoured surface and a second contoured surface different than the first contoured surface, and the plurality of flexible elements flex to contact and cover the first contoured surface and the second contoured surface of the substrate.

In accordance with another embodiment of the present disclosure, a coating applicator for applying a coating to a substrate includes a body having a first portion and a second portion, the first portion having a first contoured surface and the second portion having a second contoured surface different than the first contoured surface; and a plurality of flexible elements removably attachable to the body of the coating applicator, the plurality of flexible elements receive the coating and apply the coating to the substrate.

In one configuration, the plurality of flexible elements are transitionable between a first position in which the plurality of flexible elements contact and cover a first substrate having a first shape and a second position in which the plurality of flexible elements contact and cover a second substrate having a second shape, the second shape different than the first shape. In another configuration, the substrate has a first contoured surface and a second contoured surface different than the first contoured surface, and the plurality of flexible elements flex to contact and cover the first contoured surface and the second contoured surface of the substrate.

In accordance with another embodiment of the present disclosure, a coating applicator system includes a first substrate having a first shape; a second substrate having a second shape, the second shape different than the first shape; and a coating applicator for applying a coating, the coating applicator comprising: a body having a first portion and a second portion, the first portion having a first diameter and the second portion having a second diameter less than the first diameter; and a plurality of flexible elements removably attachable to the body of the coating applicator, the plurality of flexible elements receive the coating and apply the coating to the first substrate and the second substrate, wherein the plurality of flexible elements are transitionable between a first position in which the plurality of flexible elements contact and cover the first substrate and a second position in which the plurality of flexible elements contact and cover the second substrate.

In one configuration, the plurality of flexible elements comprise a nap.

In accordance with another embodiment of the present disclosure, a fluid application system for applying a fluid to a substrate includes a carrier; a fluid applicator for applying the fluid to the substrate, the fluid applicator removably attachable to the carrier, the fluid applicator comprising a body having a first portion and a second portion, the first portion having a first contoured surface and the second portion having a second contoured surface different than the first contoured surface; and a fluid dispensing portion for applying the fluid to the fluid applicator, the fluid dispensing portion removably attachable to the carrier, the fluid dispensing portion having a first section including a plurality of first section apertures and a second section including a plurality of second section apertures, wherein the first section apertures apply the fluid to the first portion of the fluid applicator, wherein the second section apertures apply the fluid to the second portion of the fluid applicator, wherein the first section apertures are spaced a first distance apart, wherein the second section apertures are spaced a second distance apart, and wherein the second distance is less than the first distance.

In one configuration, the fluid dispensing portion is disposed outside of the fluid applicator. In another configuration, the fluid dispensing portion is spaced a length away from the fluid applicator. In yet another configuration, the first section is adjacent to the first portion of the fluid applicator and the second section is adjacent to the second portion of the fluid applicator. In one configuration, the system further comprises a mixing portion removably attachable to the carrier, wherein the mixing portion receives a first part of the fluid and a second part of the fluid and mixes the first part and the second part theretogether. In another configuration, the fluid dispensing portion applies the fluid having the first part and the second part mixed theretogether to the fluid applicator. In yet another configuration, the carrier comprises a frame portion and a handle portion. In one configuration, the first portion includes a first section and a second section and the second portion is between the first section and the second section. In another configuration, the substrate has a first substrate contoured surface and a second substrate contoured surface different than the first substrate contoured surface, the first portion of the fluid applicator is adapted to cover the first, substrate contoured surface and the second portion of the fluid applicator is adapted to cover the second substrate contoured surface. In yet another configuration, the system further comprises a nap material removably attachable to the body of the fluid applicator, the nap material adapted to receive the fluid from the fluid dispensing portion and apply the fluid to the substrate. In one configuration, the nap material is transitionable between art undeformed position and a deformed position in which the nap material is adapted to variably cover the substrate.

In accordance with another embodiment of the present disclosure, a fluid application system for applying a fluid to a substrate includes a carrier; a fluid applicator for applying the fluid to the substrate, the fluid applicator removably attachable to the carrier, the fluid applicator comprising a body having a first portion and a second portion, the first portion having a first contoured surface and the second portion having a second contoured surface different than the first contoured surface, and a fluid dispensing portion for applying the fluid to the fluid applicator, the fluid dispensing portion removably attachable to the carrier, the fluid dispensing portion having a first section including a plurality of first section apertures and a second section including a plurality of second section apertures, wherein the first section apertures apply the fluid to the first portion of the fluid applicator, wherein the second section apertures apply the fluid to the second portion of the fluid applicator, wherein the first section apertures have a first diameter, wherein the second section apertures have a second diameter, and wherein the second diameter is greater than the first diameter.

In one configuration, the first section apertures are spaced a first distance apart, wherein the second section apertures are spaced a second distance apart, and wherein the first distance is less than the second distance. In another configuration, the first section apertures are spaced a first distance apart, wherein the second section apertures are spaced a second distance apart, and wherein the second distance is less than the first distance. In yet another configuration, the fluid dispensing portion is disposed outside of the fluid applicator. In one configuration, the fluid dispensing portion is spaced a length away from the fluid applicator. In another configuration, the first section is adjacent to the first portion of the fluid applicator and the second section is adjacent to the second portion of the fluid applicator. In yet another configuration, the system further comprises a mixing portion removably attachable to the carrier, wherein the mixing portion receives a first part of the fluid and a second part of the fluid and mixes the first part and the second part theretogether. In one configuration, the fluid dispensing portion applies the fluid having the first part and the second part mixed theretogether to the fluid applicator. In another configuration, the carrier comprises a frame portion and a handle portion. In yet another configuration, the first portion includes a first section and a second section and the second portion is between the first section and the second section. In one configuration, the system further comprises a nap material removably attachable to the body of the fluid applicator, the nap material adapted to receive the fluid from the fluid dispensing portion and apply the fluid to the substrate. In another configuration, the nap material is transitionable between an undeformed position and a deformed position in which the nap material is adapted to variably cover the substrate.

In accordance with another embodiment of the present disclosure, a fluid application system for applying a fluid to a substrate includes a carrier; a fluid applicator for applying the fluid to the substrate, the fluid applicator removably attachable to the carrier, the fluid applicator comprising a body; and a fluid dispensing portion for applying the fluid to the fluid applicator, the fluid dispensing portion removably attachable to the carrier, the fluid dispensing portion having a plurality of apertures, wherein the plurality of apertures apply the fluid to the fluid applicator; and a mixing portion removably attachable to the carrier, wherein the mixing portion receives a first part of the fluid and a second part of the fluid and mixes tire first part and the second part theretogether.

In one configuration, the plurality of apertures are spaced an equal distance apart. In another configuration, the plurality of apertures apply the fluid having the first part and the second part mixed theretogether to the fluid applicator. In yet another configuration, the fluid dispensing portion is disposed outside of the fluid applicator. In one configuration, the fluid dispensing portion is spaced a length away from the fluid applicator. In another configuration, the carrier comprises a frame portion and a handle portion.

In accordance with another embodiment of the present disclosure, a fluid application system for applying a fluid to a substrate includes a carrier; a fluid applicator for applying the fluid to the substrate, the fluid applicator removably attachable to the carrier, the fluid applicator comprising a body; and a mixing portion removably attachable to the carrier and having a mixing tip, wherein the mixing portion receives a first part of the fluid and a second part of the fluid and mixes the first part and the second part theretogether to create a mixed fluid, wherein the mixing tip applies the mixed fluid to the fluid applicator In one configuration, the mixing portion comprises a vee manifold. In another configuration, the mixing tip defines a single aperture.

In accordance with another embodiment of the present disclosure, a fluid application system for applying a fluid to a substrate includes a carrier; a fluid applicator for applying the fluid to the substrate, the fluid applicator removably attachable to the carrier, the fluid applicator comprising a body; a first mixing portion removably attachable to the carrier and having a first mixing tip, wherein the first mixing portion receives a first part of the fluid and a second part of the fluid and mixes the first part and the second part theretogether to create a first mixed fluid, wherein the first mixing tip applies the first mixed fluid to the fluid applicator; and a second mixing portion removably attachable to the carrier and having a second mixing tip, wherein the second mixing portion receives the first part of the fluid and the second part of the fluid and mixes the first part and the second part theretogether to create a second mixed fluid, wherein the second mixing tip applies the second mixed fluid to the fluid applicator.

In one configuration, the system further comprises a third mixing portion removably attachable to the carrier and having a third mixing tip, wherein the third mixing portion receives the first part of the fluid and the second par't of the fluid and mixes the first part and the second part theretogether to create a third mixed fluid, wherein the third mixing tip applies the third mixed fluid to the fluid applicator. In another configuration, the first mixing portion, the second mixing portion, and the third mixing portion each comprise a vee manifold. In yet another configuration, the first mixing tip, the second mixing tip, and the third mixing tip each define a single aperture.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 23 is a perspective view of a fluid application system in accordance with an embodiment of the present disclosure.

FIG. 24 is a side elevation view of a fluid application system in accordance with an embodiment of the present disclosure.

FIG. 25 is a side elevation view of a fluid application system in accordance with an embodiment of the present disclosure.

FIG. 26 is a perspective view of a fluid application system in accordance with an embodiment of the present disclosure.

FIG. 42 is a perspective view of a fluid application system in accordance with an embodiment of the present disclosure.

FIG. 43 is an elevation view of a fluid application system in accordance with an embodiment of the present disclosure exploded from a substrate.

Corresponding reference characters indicate corresponding parts throughout the several views. The exemplifications set out herein illustrate exemplary embodiments of the disclosure, and such exemplifications are not, to be construed as limiting the scope of the disclosure in any, manner

DETAILED DESCRIPTION

Figure 1A:
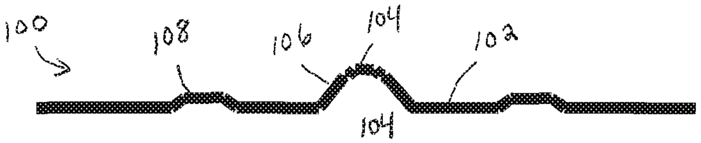
FIG. 1A is a cross-sectional view of a first substrate.
Figure 1B:
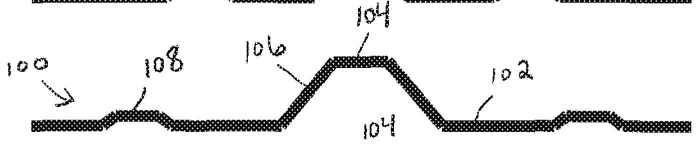
FIG. 1B is a cross-sectional view of a second substrate.
Figure 1C:
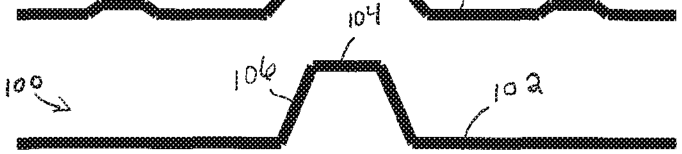
FIG. 1C is a cross-sectional view of a third substrate.
Figure 1D:
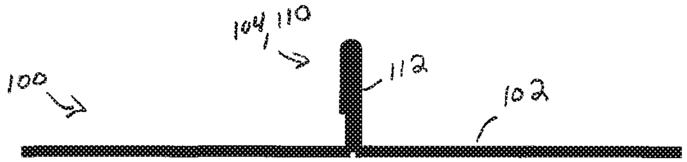
FIG. 1D is a cross-sectional view of a fourth substrate.

The following description is provided to enable those skilled in the art to make and use the described embodiments contemplated for carrying out the invention. Various modifications, equivalents, variations, and alternatives, however, will remain readily apparent to those skilled in the art Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

FIGS. 2A-16 illustrate exemplary embodiments of the present disclosure. The present disclosure provides a coating applicator that applies a coating or liquid to a variety of different substrates 100 having different contoured surfaces. The present disclosure provides a coating applicator that is able to reach, contact, and cover the entirety of a contoured substrate 100. In this manner, the coating applicator is able to transfer a coating to the entirety of the contoured substrate 100.

A coating applicator of the present disclosure is capable of applying to a substrate any coating material or liquid that will be beneficial to apply to a surface. For example, roof coatings include moisture cured urethane, two-part urethanes, acrylics, silicones, asphalt emulsions, elastomerics, primers, fibrated, not fibrated, liquefied EPDM, and various hybrids. These coatings often provide helpful benefits such as reducing thermal expansion and contraction as well as reducing indoor temperatures because of reflectivity. Other liquids may be used on other surfaces. For example, lubricants are often required to be applied to channeled or contoured surfaces. Aggregated asphaltic surfaces and concrete need their porous surfaces to be sealed with liquid sealers.

Figure 1E:
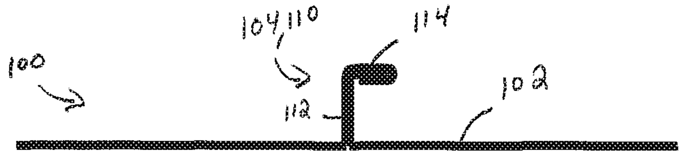
FIG. 1E is a cross-sectional view of a fifth substrate.
Figure 1F:
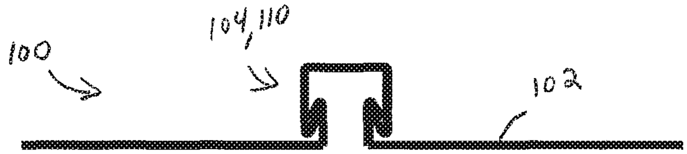
FIG. 1F is a cross-sectional view of a sixth substrate.
Figure 1G:
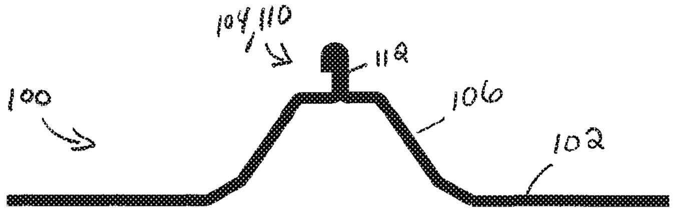
FIG. 1G is a cross-sectional view of a seventh substrate.

FIGS. 1A-1G illustrate exemplary substrates that can be completely covered by a coating applicator of the present disclosure. Referring to FIGS. 1A-1G, a substrate 100 includes a first contoured surface 102, a second contoured surface 104, and a third contoured surface 106. As shown in FIGS. 1A-1G, each of the contours of the first contoured surface 102, the second contoured surface 104, and the third contoured surface 106 are different. In some embodiments, a substrate 100 also includes a fourth contoured surface 108 as shown in FIG. 1A In other embodiments, a substrate 100 includes a protruding element 110 that includes a vertical element 112 and a horizontal element 114 as shown in FIG. 1E.

Figure 17:
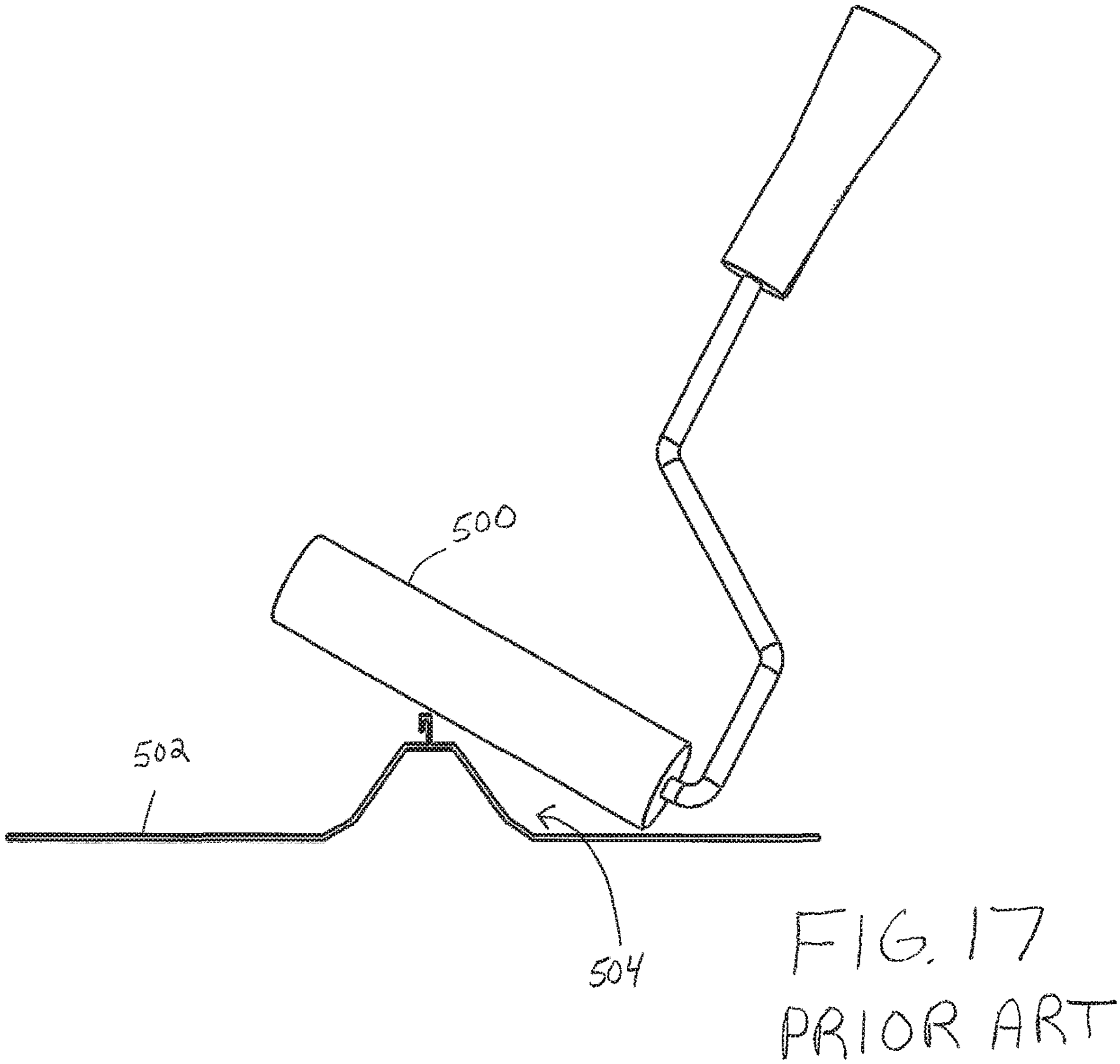
FIG. 17 PRIOR ART
FIG. 17 is an elevation view of a conventional roller illustrating the conventional roller not being able to contact all of the areas of a contoured substrate.

Disadvantageously, referring to FIG. 17, when a conventional roller 500 is used to apply a coating to a substrate 502 that is channeled, corrugated, or ribbed, the surface irregularities prevent the conventional roller 500 from contacting the substrate 502 to be coated. Thus, as a conventional roller 500 is used with such a substrate 502, the liquid cannot be adequately transferred from the conventional roller 500 to the substrate 502 because the conventional roller 500 cannot contact all of the areas of the substrate 502 or roof panel. The areas of the substrate 502 that are not contacted by the conventional roller 500, i.e., non-contacted areas 504, do not receive the liquid or coating. This results in many areas 504 of the substrate 502 being uncovered by the liquid or coating. The present invention solves such problems by providing a coating applicator that is able to reach, contact, and coat the entirety of such a contoured substrate.

Figure 2A:
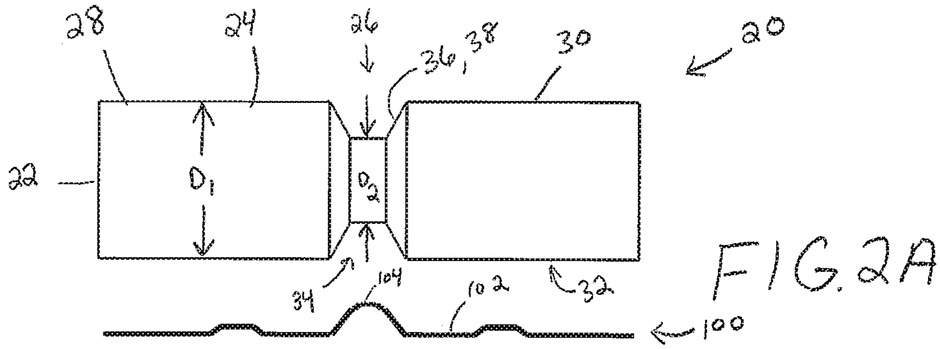
FIG. 2A is an elevation view of a first coating applicator in accordance with an embodiment of the present disclosure exploded from a substrate, the coating applicator adapted to reach, contact, and cover with a coating the various shapes, angles, contours, diameters, or small variations thereof of the contoured substrate.
Figure 12:
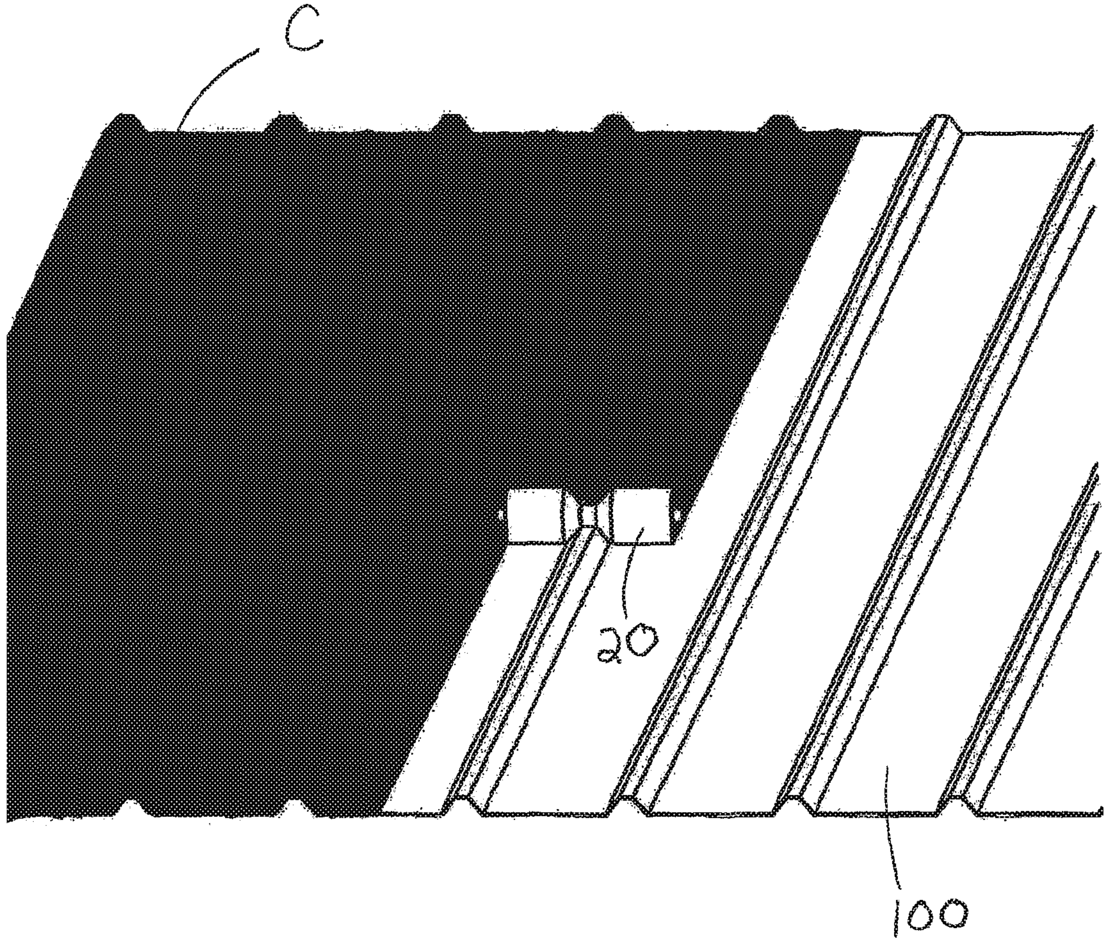
FIG. 12 is a perspective view or a coating applicator applying a coating to a substrate in accordance with an embodiment of the present disclosure.

Referring to FIG. 2A, a coating applicator 20 for applying a coating C (FIG. 12) to a substrate 100 includes a body 22 having a first portion 24 and a second portion 26. The first portion 24 of coating applicator 20 includes a first section 28 and a second section 30 and the second portion 26 is located between the first section 28 and the second section 30 of the first portion 24. Iii one embodiment, the first portion 24 of coating applicator 20 has a first diameter D1 and the second portion 26 has a second diameter D2 that is less than the first diameter D1 By having a coating applicator 20 that includes portions having different diameters, the first portion 24 of the coating applicator 20 is able to cover the first contoured surface 102 of the substrate 100 and the second portion 26 of the coating applicator 20 is able to cover the second contoured surface 101 of the substrate 100. In this manner, the coating applicator 20 is able to contact the entirety of a substrate 100 having different contoured surfaces. Thus, a coating applicator 20 of the present disclosure is able to transfer a coating C to the entirety of the contoured substrate 100 as shown in FIG. 12. In one embodiment, the coating applicator 20 is a roller.

In one embodiment, a coating applicator of the present disclosure may include a body having any combination of first and second diameters to correspond to any variety of first and second contoured surfaces of a substrate. In one embodiment, a coating applicator of the present disclosure may include any number of varying diameters to correspond to any number of varying contoured surfaces of a substrate.

Figure 6:
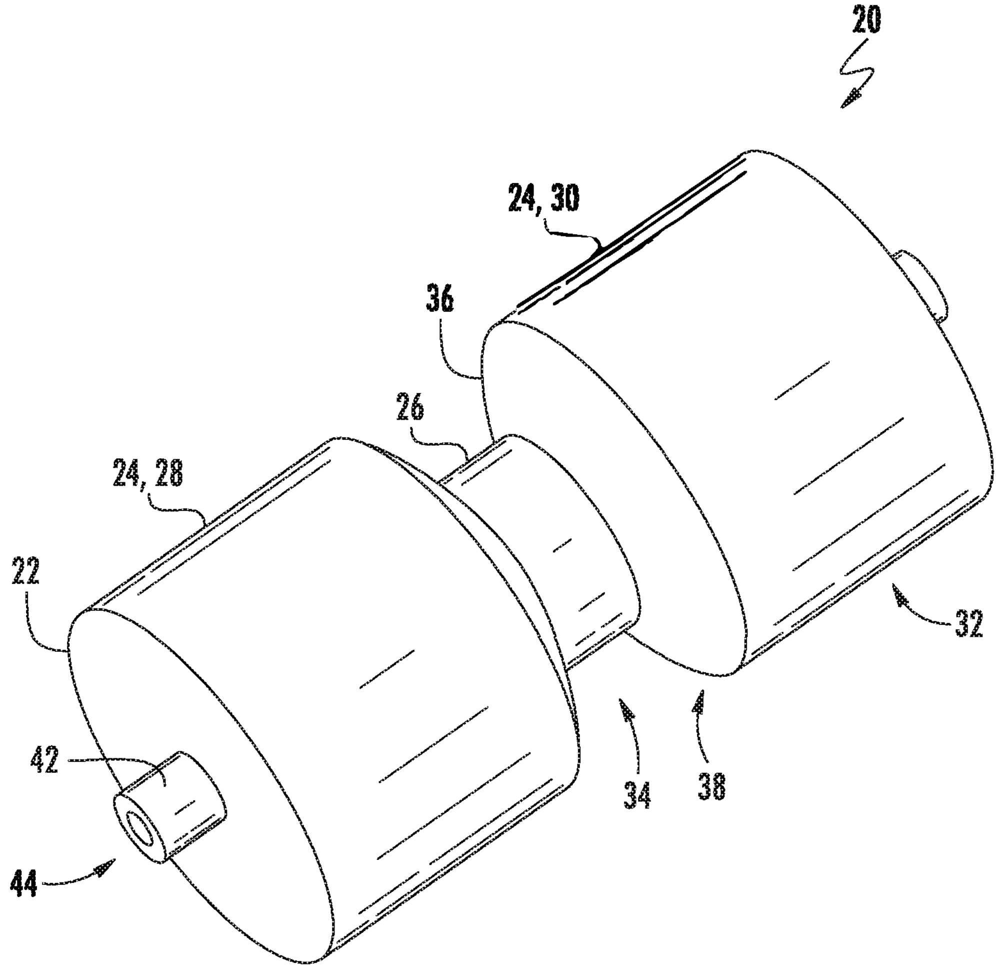
FIG. 6 is a perspective view of a coating applicator in accordance with an embodiment of the present disclosure
Figure 7:
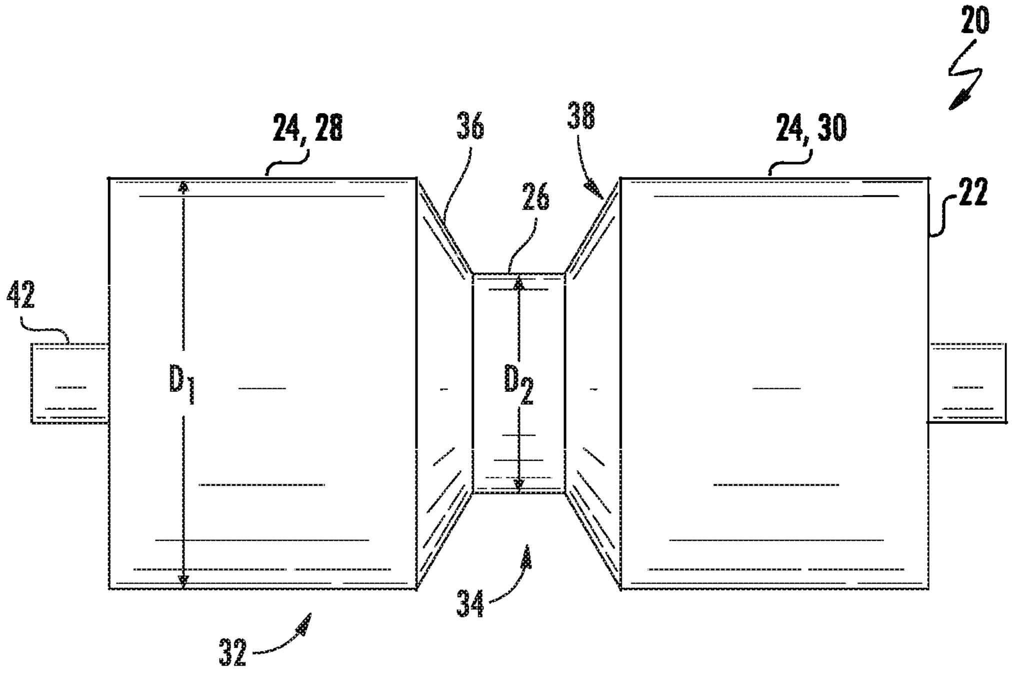
FIG. 7 is a front, elevation view of a coating applicator in accordance with an embodiment of the present disclosure.
Figure 13:
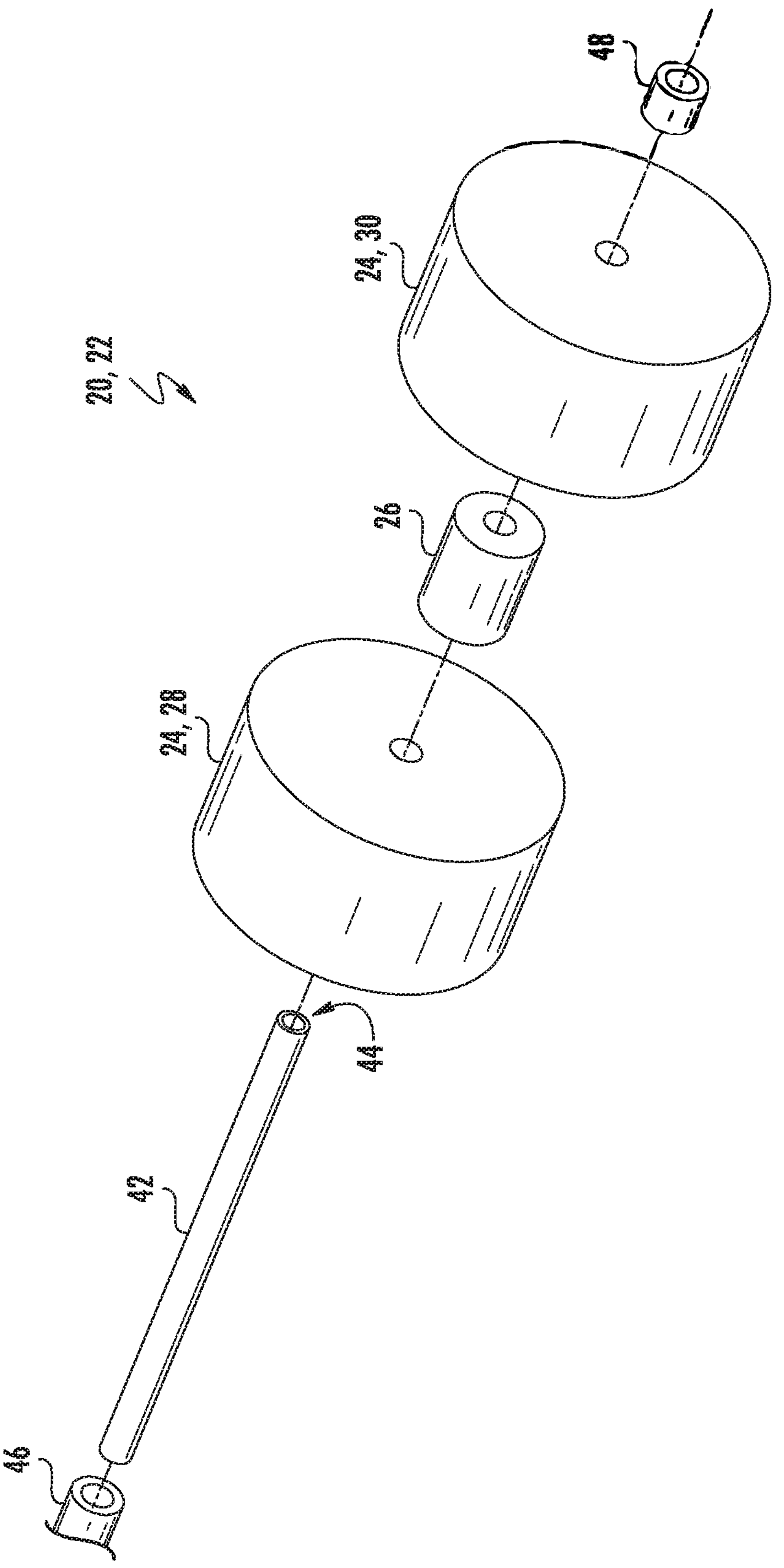
FIG. 13 is an exploded, perspective view of a coating applicator in accordance with an embodiment of the present disclosure.

Referring to FIGS. 6, 7, and 13, in one embodiment, the body 22 of the coating applicator 20 includes a central spool 42 defining an aperture 44 therethrough. The central spool 42 of the coating applicator 20 is configured to receive an axle member for rotatably connecting the coating applicator 20 to a carrier so that a user is able to conveniently apply a coating or a liquid to a substrate as will be described in more detail below.

Referring to FIG. 2A, in one embodiment, the first portion 24 of the coating applicator 20 has a first contoured surface 32 and the second portion 26 has a second contoured surface 34 that is different than the first contoured surface 32. By having a coating applicator 20 that includes portions having different contoured surfaces, the first portion 24 of the coating applicator 20 is able to cover the first contoured surface 102 of the substrate 100 and the second portion 26 of the coating applicator 20 is able to cover the second contoured surface 104 of the substrate 100. In this manner, the coating applicator 20 is able to contact the entirety of a substrate 100 having different contoured surfaces. Thus, a coating applicator 20 of the present disclosure is able to transfer a coating C to the entirety of the contoured substrate 100.

In one embodiment, a coating applicator of the present disclosure may include a body having any combination of geometric shapes to form two different first and second contoured surfaces to correspond to any variety of first and second contoured surfaces of a substrate. In one embodiment, a coating applicator of the present disclosure may include any number of different geometric shapes to correspond to any number of varying contoured surfaces of a substrate.

Referring, to FIG. 2A, in one embodiment, the body 22 of the coating applicator 20 includes a third portion 36 that is located between the first portion 24 and the second portion 26. In one embodiment, the third portion 36 is tapered. The third portion 36 has a third contoured surface 38 that is different than the second contoured surface 34 and the first contoured surface 32.

By having a coating applicator 20 that includes portions having three different contoured surfaces, the first portion 24 of the coating applicator 20 is able to cover the first contoured surface 102 of the substrate 100, the second portion 26 of the coating applicator 20 is able to cover the second contoured surface 104 of the substrate 100, and the third portion 36 of the coating applicator 20 is able to cover the third contoured surface 106 of the substrate 100. In this manner, the coating applicator 20 is able to contact the entirety of a substrate 100 having three different contoured surfaces. Thus, a coating applicator 20 of the present disclosure is able to transfer a coating C to the entirety of the contoured substrate 100.

Figure 2B:
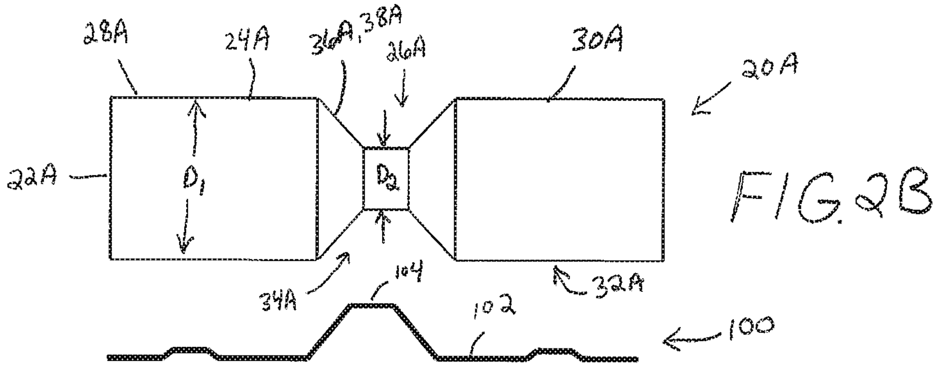
FIG. 2B is an elevation view of a second coating applicator in accordance with an embodiment of the present disclosure exploded from a substrate, the coating applicator adapted to reach, contact, and cover with a coating the various shapes, angles, contours, diameters, or small variations thereof of the contoured substrate.
Figure 2C:
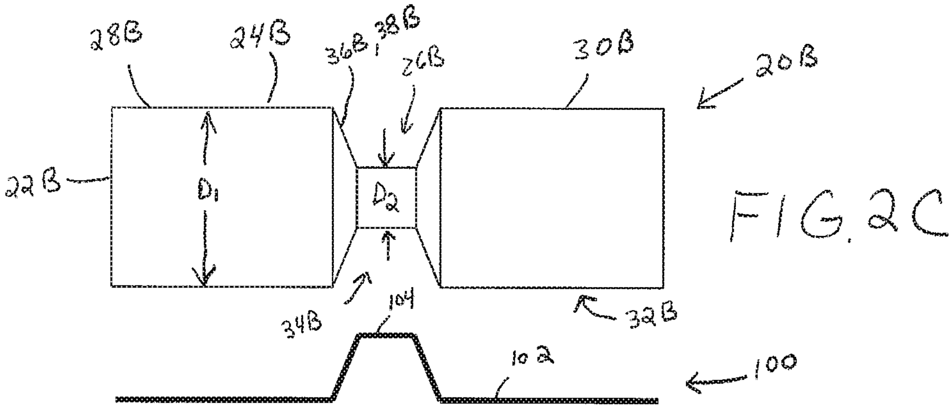
FIG. 2C is an elevation view of a third coating applicator in accordance with an embodiment of the present disclosure exploded from a substrate, the coating applicator adapted to reach, contact, and cover with a coating the various shapes, angles, contours, diameters, or small variations thereof of the contoured substrate.
Figure 2D:
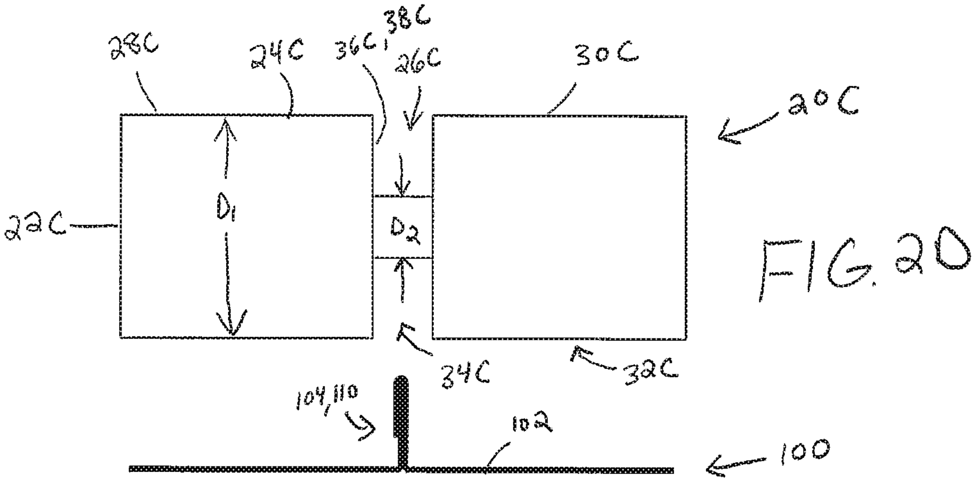
FIG. 2D is an elevation view of a fourth coating applicator in accordance with an embodiment of the present disclosure exploded from a substrate, the coating applicator adapted to reach, contact; and cover with a coating the various shapes, angles, contours, diameters, or small variations thereof of the contoured substrate.
Figure 2E:
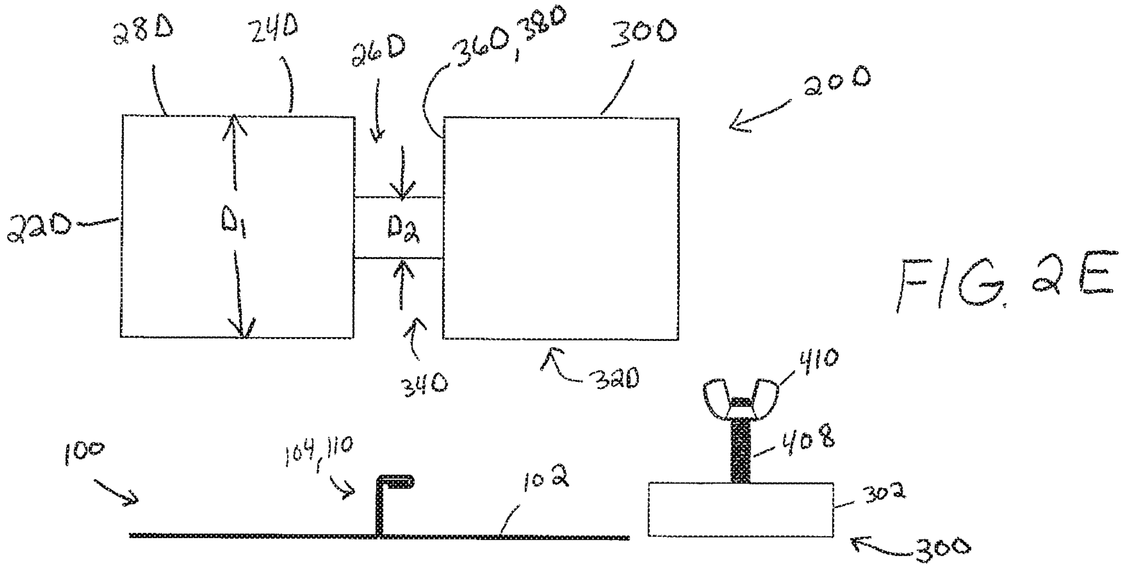
FIG. 2E is an elevation view of a fifth coating applicator in accordance with an embodiment of the present disclosure exploded from a substrate, the coating applicator adapted to reach, contact, and cover with a coating the various shapes, angles, contours, diameters, or small variations thereof of the contoured substrate.
Figure 3:
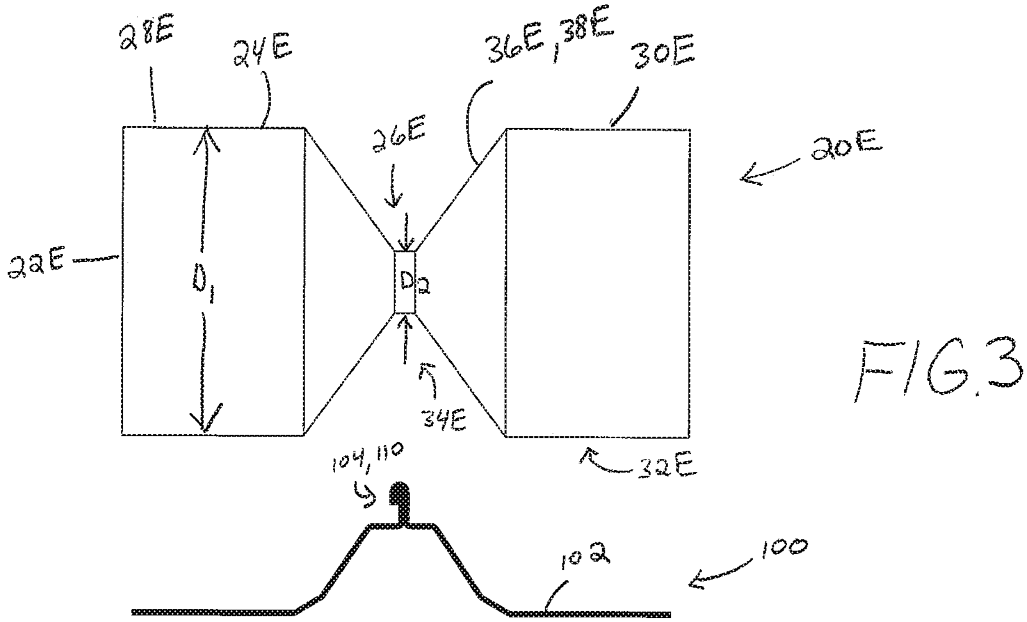
FIG. 3 is an elevation view of a sixth coating applicator in accordance with an embodiment of the present disclosure exploded from a substrate, the coating applicator adapted to reach, contact, and cover with a coating the various shapes, angles, contours, diameters, or small variations thereof of the contoured substrate.

FIGS. 2B-3 illustrate other exemplary embodiments of the present disclosure. The exemplary embodiment illustrated in FIG. 2B includes similar components to the embodiment illustrated in FIG. 2A, and the similar components are denoted by a reference number followed by the letter A, The exemplary embodiment illustrated in FIG. 2C includes similar components to the embodiment illustrated in FIG. 2A, and the similar components are denoted by a reference number followed by the letter B. The exemplary embodiment illustrated in FIG. 2D includes similar components to the embodiment illustrated in FIG. 2A, and the similar components are denoted by a reference number followed by the letter C. The exemplary embodiment illustrated in FIG. 2E includes similar components to the embodiment illustrated in FIG. 2A, and the similar components are denoted by a reference number followed by the letter D. The exemplary embodiment illustrated in FIGS. 3-5 includes similar components to the embodiment illustrated in FIG. 2A, and the similar components are denoted by a reference number followed by the letter E. For the sake of brevity, these similar components and the similar steps of using the other exemplary embodiments of the coating applicator will not all be discussed in conjunction with the embodiments illustrated in FIGS. 2B-3.

Figure 4:
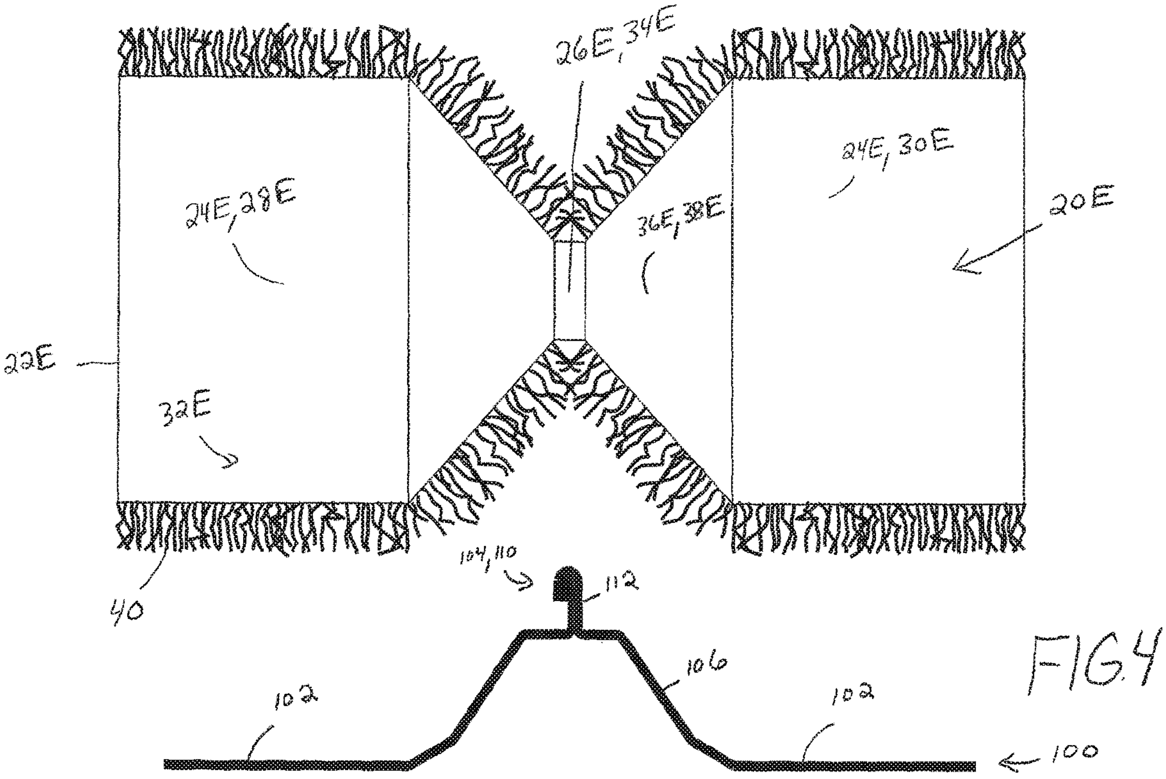
FIG. 4 is an elevation view of a coating applicator in accordance with an embodiment of the present disclosure exploded from a substrate, the coating applicator including a nap element in an undeformed position.
Figure 5:
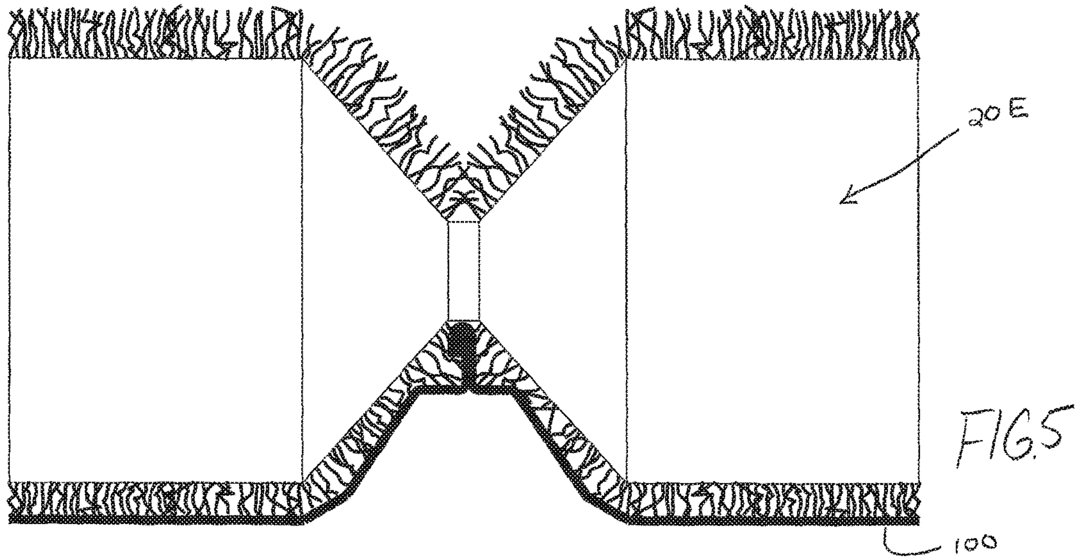
FIG. 5 is an elevation view of a coating applicator in accordance with an embodiment of the present disclosure in contact and covering a substrate, the coating applicator including a nap element in a deformed position.

Referring to FIGS. 3-5, with the coating applicator 20E in contact with the substrate 100, the first portion 24E of the coating applicator 20E covers the first substrate contoured surface 102, the second portion 26E of the coating applicator 20E is adapted to cover the second substrate contoured surface 104, and the third portion 36E of the coating applicator 20E is adapted to cover the third substrate contoured surface 106 as shown in FIG. 5. Thus, the coating applicator 20E is sized and shaped to match the contours of the substrate 100. In this manner, the coating applicator 20E is able to contact the entirety of a substrate 100 having different contoured surfaces. Thus, a coating applicator 20E of the present disclosure is able to transfer a coating to the entirety of the contoured substrate 100.

Referring to FIGS. 4 and 5, in one embodiment, the coating applicator 20E includes a plurality of flexible elements 40 that are removably attachable to the body 22E of the coating applicator 20E. The plurality of flexible elements 40 are able to receive and temporarily hold a coating C or liquid and are compressible to release a coating C or liquid onto a substrate when contacted. In this manner, with the coating C or liquid held in the plurality of flexible elements 40, the coating applicator 20E can be rolled over the surface of a substrate 100 thereby releasing the coating C or liquid onto the substrate 100.

In one embodiment, the plurality of flexible elements 40 form a nap element or material. In one embodiment, the hacking of the nap element 40 is rigid enough to maintain a shape when cut and formable enough to bend around various geometric shapes.

In one embodiment, the plurality of flexible elements 40 are transitionable between a first position in which the plurality of flexible elements 40 contact and cover a first substrate having a first shape and a second position in which the plurality of flexible elements 110 contact and cover a second substrate having a second shape, the second shape different than the first shape.

In one embodiment, a substrate has a first contoured surface and a second contoured surface different than the first contoured surface, and the plurality of flexible elements 40 flex to contact and cover the first contoured surface and the second contoured surface of the substrate.

As discussed above, referring to FIG. 17, when a conventional roller 500 is used to apply a coating to a substrate 502 that is channeled, corrugated, or ribbed, the surface irregularities prevent the conventional roller 500 from contacting the substrate 502 to be coated.

Advantageously, the present disclosure provides the plurality of flexible elements 40 removably attachable to the body 2215 of the coating applicator 20E which flex to contact and cover each and every portion of a substrate having any shape or contoured surface. For example, the plurality of flexible elements 40 flex and deform to fill up any gaps between a substrate and a coating applicator. In this manner, the plurality of flexible elements 40 contact and cover each and every portion of a substrate having any shape or contoured surface Furthermore, in this manner, a coating is completely transferred and/or applied from the plurality of flexible elements 40 of the coating applicator to the entirety of a substrate. In this manner, all the cracks and crevices of a substrate receive a layer of coating.

In one embodiment, the plurality of flexible elements 40 are transitionable between an undeformed position as shown in FIG. 4 and a deformed position in which the plurality of flexible elements 40 are adapted to variably cover a substrate 100, i.e., the plurality of flexible elements 40 are able to cover many different contours of a substrate, as shown in FIG. 5. Referring to FIG. 5, as the coating applicator 20E contacts the substrate 100, the plurality of flexible elements 40 deform such that the plurality of flexible elements 40 match the contours of the substrate 100. For example, the plurality of flexible elements 40 deform such that the plurality of flexible elements 40 are able to cover the vertical element 112 extending from the substrate 100. In this manner, the coating applicator 20E is able to contact the entirety of a substrate 100 having different contoured surfaces and elements extending therefrom Thus, a coating applicator 20E of the present disclosure is able to transfer a coating to the entirety of the contoured substrate 100. In other words, the plurality of flexible elements 40 of the coating applicator 20E are sized and shaped such that the plurality of flexible elements 40 and the coating applicator 20E are able to reach, contact, and cover with a coating the various shapes, angles, contours, diameters, or small variations thereof of a contoured substrate. The plurality of flexible elements 40 provide the coating applicator 20E with the ability to contact and cover with a coating these varying geometric elements of a contoured substrate.

Referring to FIG. 2A, with a plurality of flexible elements 40 attached to the body 22 of the coating applicator 20, the coating applicator 20 would also be able to cover the fourth substrate contoured surface 108. As the coating applicator 20 contacts the substrate 100, the plurality of flexible elements 40 would deform more at the contact spot with the fourth substrate contoured surface 108 and less at the contact spot with the first substrate contoured surface 102. In this manner, the coating applicator 20 is able to contact the entirety of a substrate 100 having different contoured surfaces and elements extending therefrom. Thus, a coating applicator 20 of the present disclosure is able to transfer a coating to the entirety of the contoured substrate 100.

Referring to FIGS. 6-9, the connection of a coating applicator 20 of the present disclosure to a carrier will now be described. By connecting the coating applicator to a carder, a user is able to conveniently maneuver the coating applicator to apply a coating or a liquid to a substrate.

Figure 8:
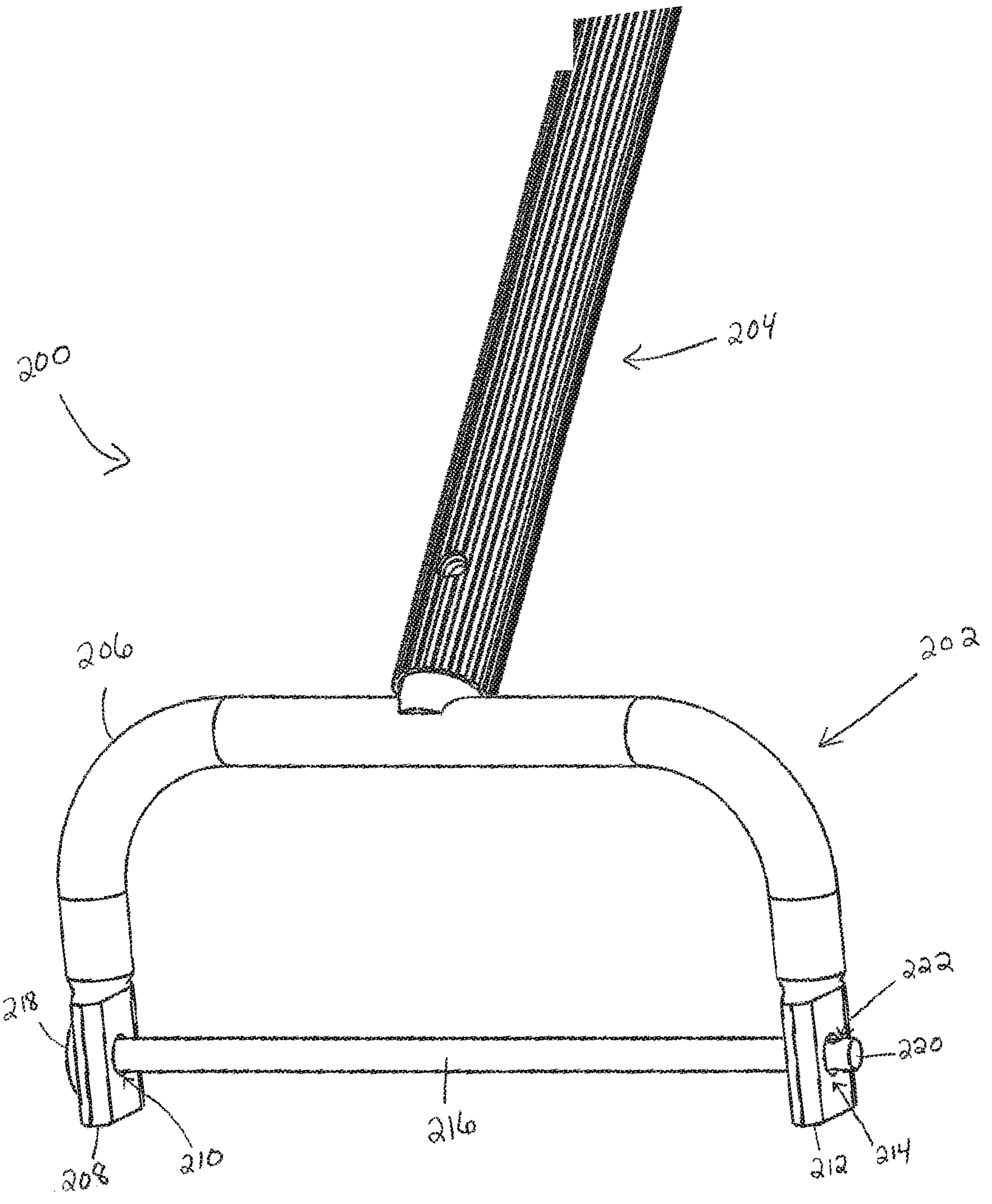
FIG. 8 is a perspective view of a carrier in accordance with an embodiment of the present disclosure.
Figure 9:
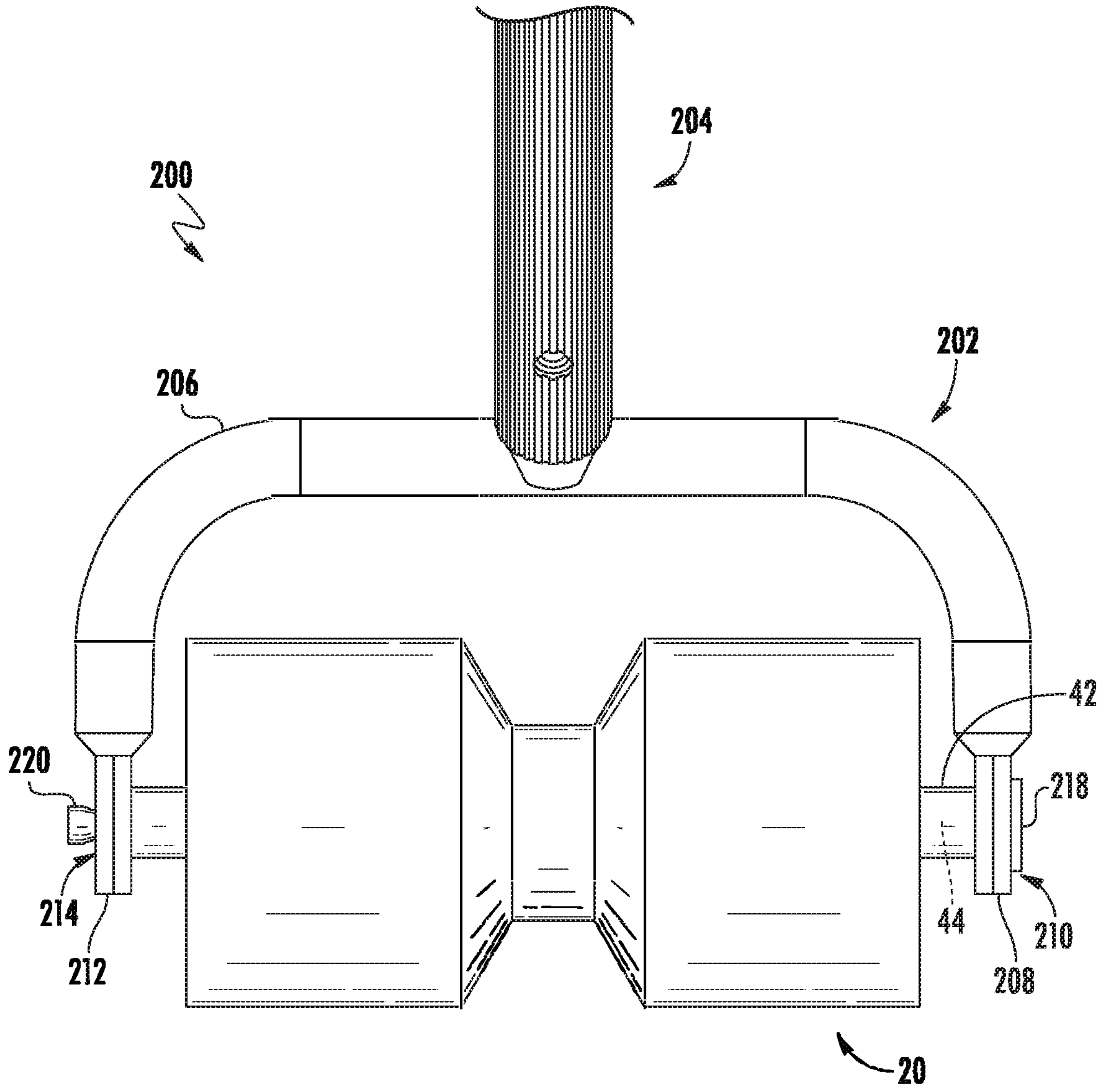
FIG. 9 is an elevation view of a coating applicator rotatably attached to a carrier in accordance with an embodiment of the present disclosure.

Referring to FIGS. 8 and 9, a carder 200 includes a frame or applicator portion 202 and a handle portion 204 extending from the applicator portion 202. In one embodiment, the applicator portion 202 includes a generally U-shaped frame member 206 having a first frame end 203 defining a first bearing hole 210 and a second frame end 212 defining a second bearing hole 214. Each end 208, 212 of the frame member 206 defines a bearing hole 210, 214 for rotatably mounting a roller axle 216 to the frame member 206. The roller axle 216 includes a first end 218 and a second end 220 defining an aperture 222. In one embodiment, with the roller axle 216 rotatably mounted to the frame member 206 as shown in FIG. 8, a threaded fastener or similar fastener member may be secured to the second end 220 of the roller axle 216 to secure the roller axle 216 to the frame member 206. In other embodiments, a locking pin could be inserted into the aperture 222 of the second end 220 of the roller axle 216 to secure the roller axle 216 to the frame member 206.

Figure 10:
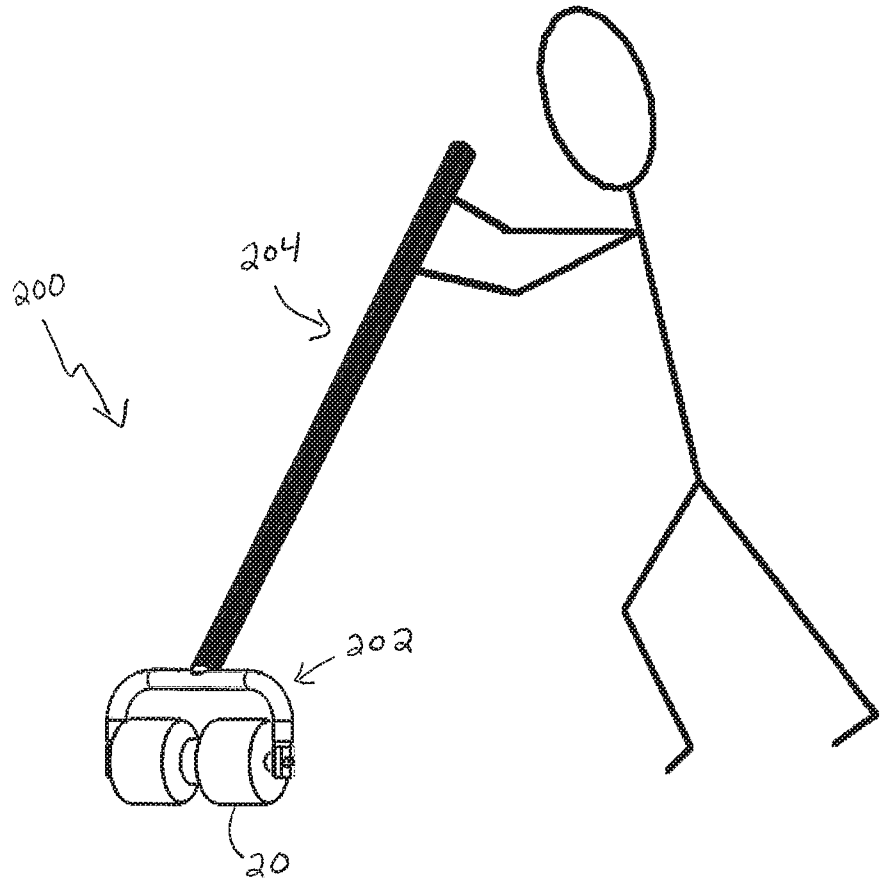
FIG. 10 is a perspective view of a coating applicator rotatably attached to a carrier and being maneuvered by a user in accordance with an embodiment of the present disclosure.

To rotatably secure a coating applicator 20 to the carrier 200, a coating applicator 20 is positioned between the first frame end 208 and the second frame end 212 of the frame member 206 of the carrier 200 as shown in FIG. 9. Next, a roller axle 216 is inserted through the first bearing hole 210 of the frame member 206 and then within the aperture 44 of the central spool 42 of the coating applicator 20 until the second end 220 of the roller axle 216 extends through the second bearing hole 214 as shown in FIG. 9. Next, a fastener may be secured to the second end 220 of the roller axle 216 to rotatably secure the coating applicator 20 and the roller axle 216 to the frame member 206. In this manner, the handle portion 204 of the carrier 200 can be used to conveniently move or roll a coating applicator 20 over a substrate to apply a coating or a liquid to the substrate as shown in FIG. 10. The connection between the coating applicator 20 and the carrier 200 is removable, such that, after use the coating applicator 20 is removable from the carrier 200.

Figure 11:
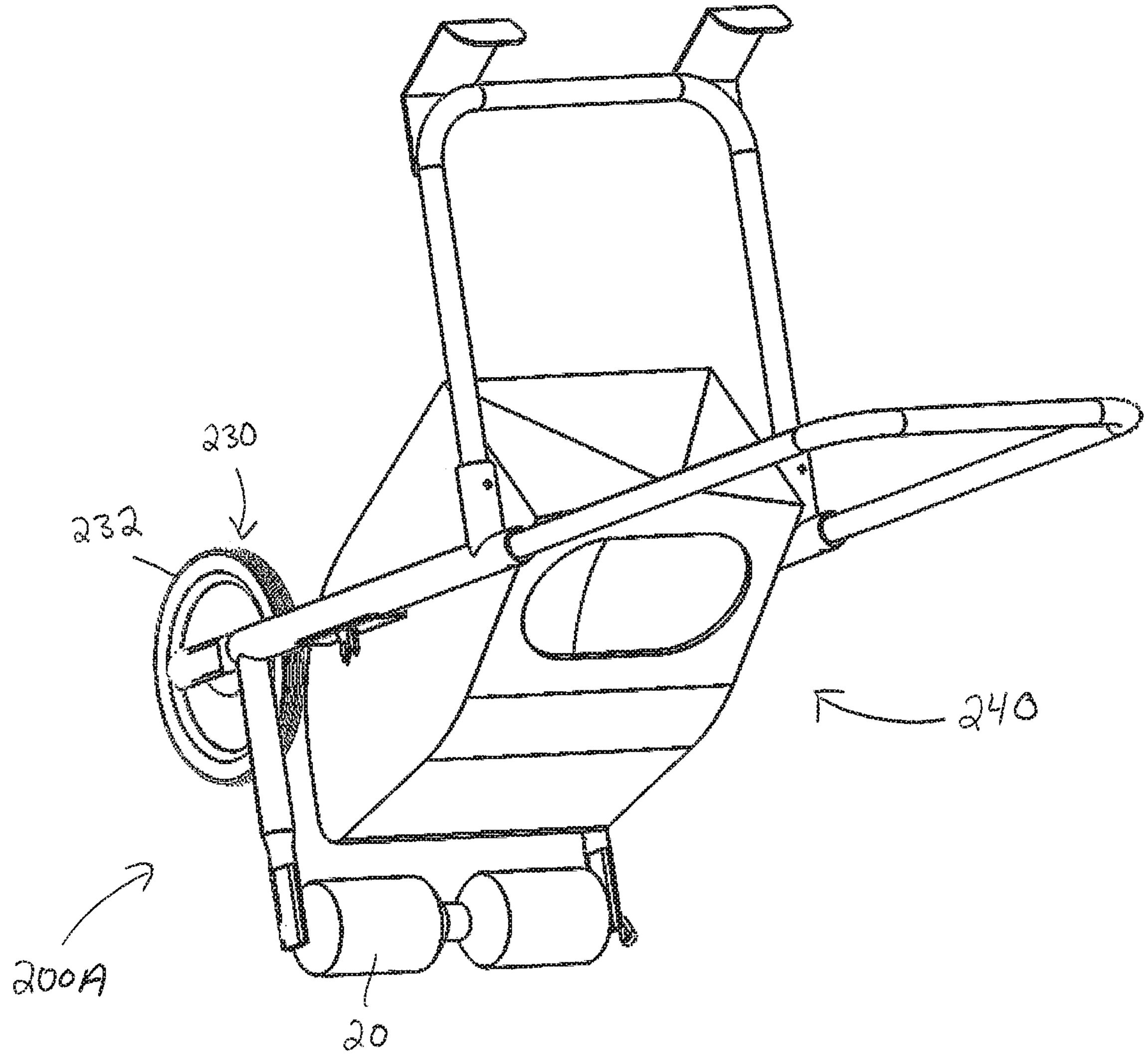
FIG. 11 is a perspective view of a coating applicator rotatably attached to a carrier in accordance with an embodiment of the present disclosure.

In one embodiment, a carrier 200A includes a movable support 230 for transporting the carrier 200A along a substrate as shown in FIG. 11. The movable support 230 may include a wheel 232 or a plurality of wheels. Referring to FIG. 11, in one embodiment, the carrier 200A includes a tank spreader 240.

The present disclosure provides a coating applicator system that is able to apply a coating or liquid to a variety of different substrates 100 having different contoured surfaces The present disclosure provides a system that includes a first coating applicator that is able to contact the entirety of a first contoured substrate and a second coating applicator that is able to contact the entirety of a second contoured substrate that is different than the first contoured substrate. Because roof panels and other substrates have different shapes and contours as shown in FIGS. 1A-3, a system of the present disclosure allows a user to select a particular coating applicator for a desired coating project for a particular contoured substrate. In this manner, the system of the present disclosure allows any contoured substrate to be completely coated.

Referring to FIGS. 2A-3, any of the coating applicators can be removably attachable to a carrier such as carrier 200 as shown in FIGS. 9 and 10. Accordingly, a user may select any coating applicator to correspond to a particular contoured substrate and removably attach that coating applicator to a carrier Once rotatably secured to the carrier, a user is able to conveniently apply a coating or a liquid to the entirety of a first contoured substrate. Upon completion, the user may remove the first coating applicator from the carder. Next, if a differently contoured substrate needs to be coated, a user may then select a second coating applicator different than the first coating applicator and attach the second coating applicator to the carrier. Once rotatably secured to the carrier, a user is able to conveniently apply a coating or a liquid to the entirety of a second contoured substrate. Upon completion, the user may remove the second coating applicator from the carrier. In this manner, the system of the present disclosure allows any contoured substrate to be completely coated.

In one embodiment, for example, the system of the present disclosure includes a first coating applicator 20 (FIG. 2A) for applying a coating to a first substrate, the first coating applicator 20 removably attachable to the carrier, and the first coating applicator 20 having a first body 22 having a first portion 24 and a second portion 26, the first portion 24 having a first diameter D1 and the second portion 26 having a second diameter D2 different than the first diameter D1. The system of the present disclosure also includes a second coating applicator 20E (FIGS. 3-5) for applying a coating to a second substrate, the second coating applicator 20E removably attachable to the carder, and the second coating applicator 20F having a second body 22E having a third portion 24E and a fourth portion 26E, the third portion 24E having a third diameter and the fourth portion 26E having a fourth diameter different than the third diameter. In one embodiment, the first diameter of the first portion 24 of the first coating applicator 20 is different than the third diameter of the third portion 24E of the second coating applicator 20E. In one embodiment, the second diameter of the second portion 26 of the first coating applicator 20 is different than the fourth diameter of the fourth portion 26E of the second coating applicator 20E.

Figure 15:
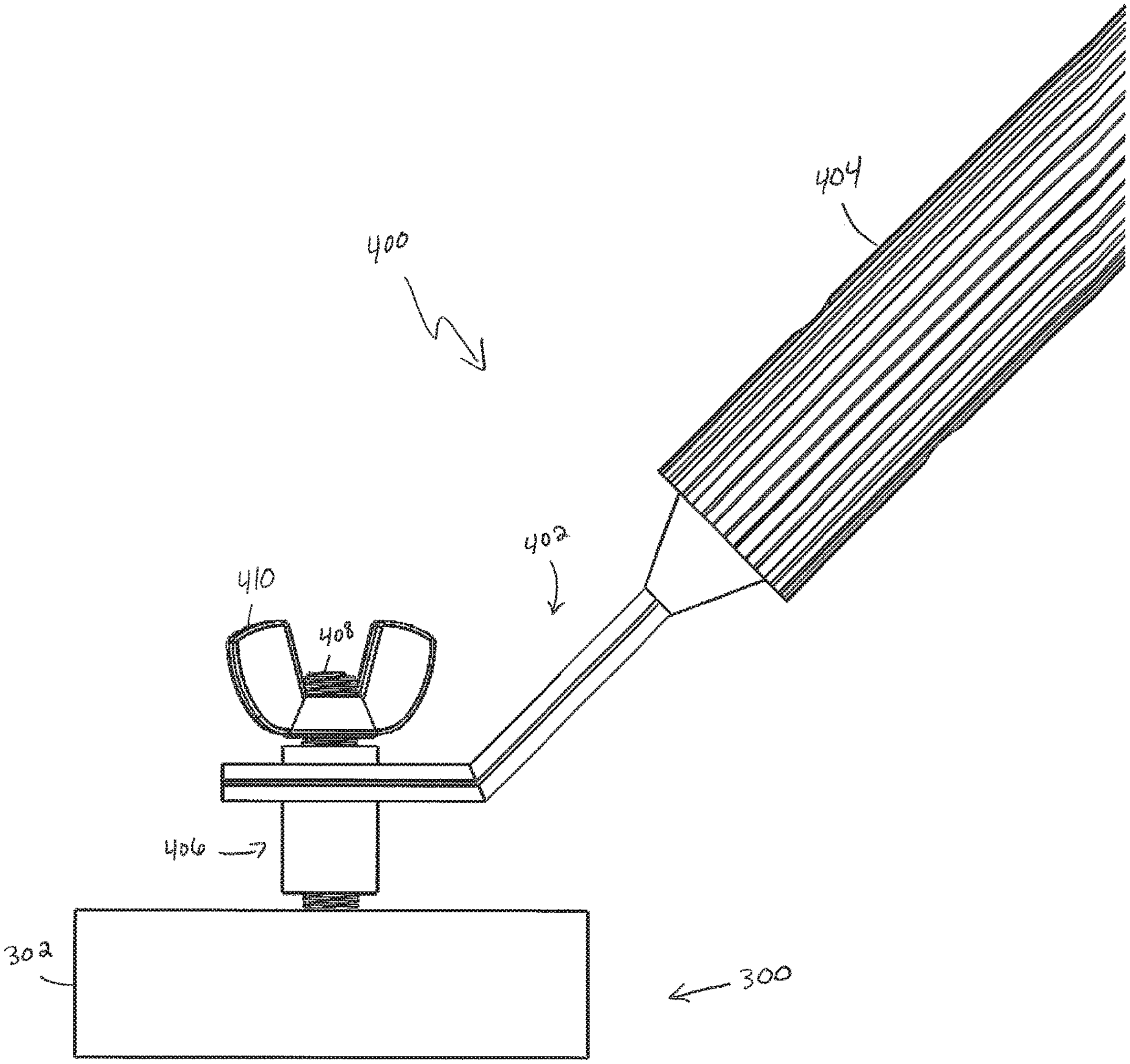
FIG. 15 is an assembled, elevation view of a coating applicator rotatably attached to a carrier in accordance with an embodiment of the present disclosure.
Figure 16:
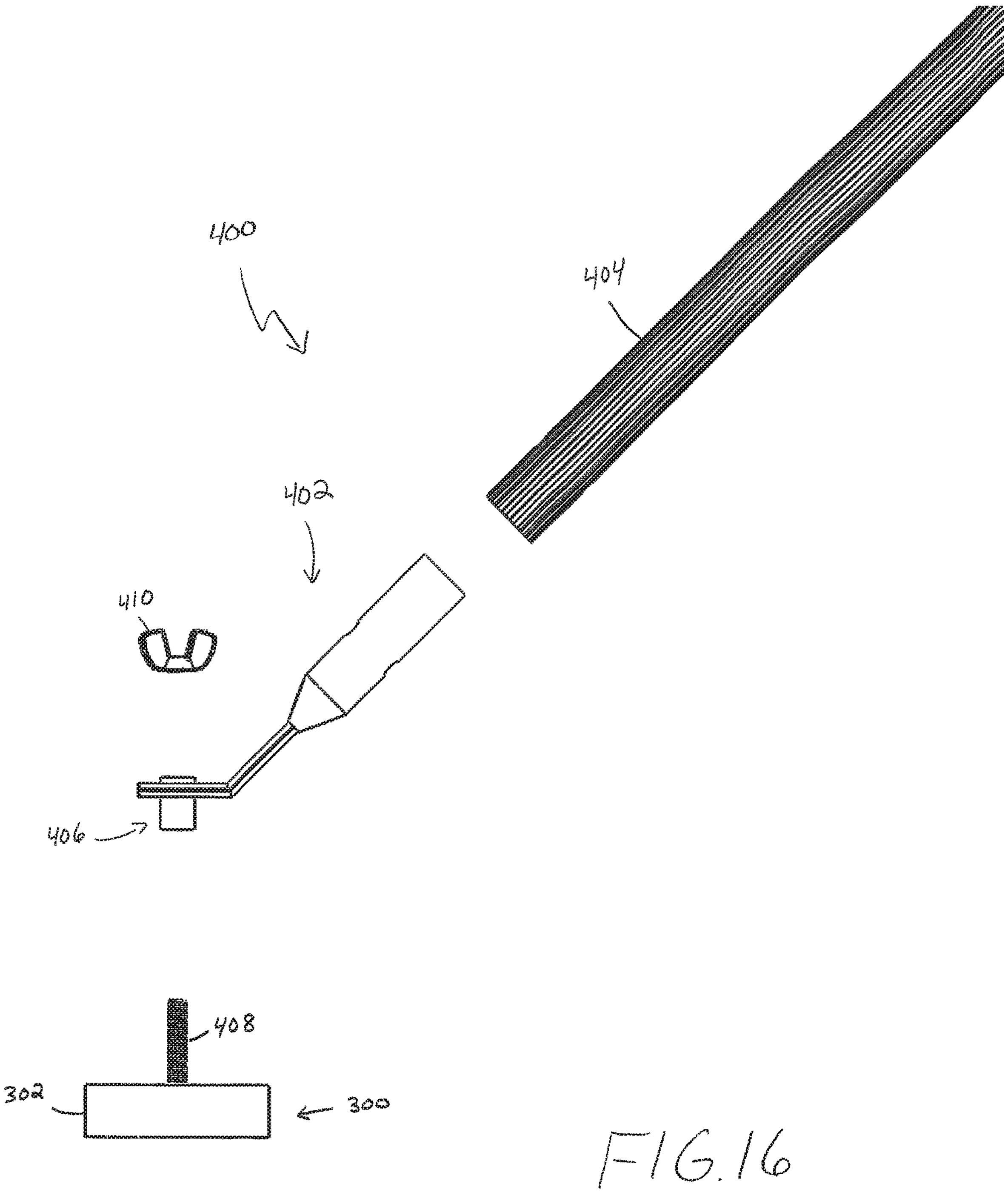
FIG. 16 is an exploded, elevation view of a coating applicator and a carrier in accordance with an embodiment of the present disclosure.

Referring to FIGS. 2E, 15, and 16, in one embodiment, the system of the present disclosure may also include an additional coating applicator 300 for the purpose of coating alternative hard to reach surfaces. For example, referring to FIGS. 1E and 2E, a substrate may include a protruding vertical element 112 and protruding horizontal element 114. A hard to reach surface area may be created when the contour of a surface to be coated contains such an overhanging protruding element projecting over the main surface. In some instances, such an overhanging protruding element, requires a second process to apply a coating to such an area. The coating applicator 300 can be used to perform this second process. Coating applicator 300 is adapted to reach, contact, and coat such areas that are covered by overhanging projections.

Referring to FIGS. 15 and 16, a coating applicator 300 for applying a coating to a substrate 100 includes a body 302. In one embodiment, the body 302 of the coating applicator 300 may include a first outer portion defined by an outer diameter and a second round portion defined by the outer diameter of the first outer portion.

Referring to FIGS. 15 and 16, the connection of the coating applicator 300 of the present disclosure to a carrier 400 will now be described. By connecting the coating applicator 300 to a carrier 400, a user is able to conveniently apply a coating or a liquid to a substrate. The carrier 400 includes a frame or applicator portion 402 and a handle portion 404 extending from the applicator portion 402. In one embodiment, the applicator portion 402 includes an axle housing 406 for rotatably receiving an axle 408 that is attached to the coating applicator 300 as shown in FIGS. 15 and 16. In one embodiment, a nap element is attached to the coating applicator 300 as described above. The axle housing 406 receives the axle 408 as shown in FIG. 15 and allows the coating applicator 300 to be rotated as the coating is applied to the above-described overhang area. In one embodiment, a fastener 410 can be used to rotatably secure the axle 408 to the axle housing 406 and the carrier 400 as shown in FIG. 15.

Referring to FIGS. 6, 7, 13, and 14, a variety of methods of manufacturing for a coating applicator of the present disclosure will now be described. The creation of a body of a coating applicator of the present disclosure can be achieved through a number of methods known by those skilled in the art.

In one embodiment, a method of forming a coaling applicator may include the following steps: (1) selecting a first portion of substantially solid mass that can be formed to match a first contour of a substrate; (2) selecting a second portion of substantially solid mass that can be formed to match a second contour of a substrate; (3) engaging the first portion with a tool to form a first shape, (4) engaging the second portion with a tool to form a second shape; and (5) combining the first portion and the second portion to form a coating applicator that is adapted to cover a substrate having a first contour and a second contour. In one embodiment, a method of forming a coating applicator allows for a coating applicator to be custom-made to reach, contact, and cover with a coating the various shapes, angles, contours, diameters, or small variations thereof of a contoured substrate. In one embodiment, the coating applicator of the present disclosure is formed from one integral or homogeneous component.

In one embodiment, when the material of the body of a coating applicator is wood or plastic, the body may be shaped on a lathe. For example, referring to FIGS. 6 and 7, the diameter D1 of a first portion 24 of a body 22 can be formed to a first desired size and shape, e.g., a cylindrical shape. Next, tooling can engage the body 22 to cut or carve out material until a desired inner or second diameter D2 is formed to create the second portion 26 of the body 22 of the coating applicator 20. In one embodiment, tooling can then be used to form a third portion 36 of the body 22. For example, the third portion 36 may be a vertical or tapered portion between the first portion 24 and the second portion 26. In one embodiment, if the contour of the substrate has an angled portion, the third portion 36 of the body 22 may include a frustum shaped contoured portion.

Other methods of creating a body of a coating applicator can include a molded material where an outer mold is formed so that the body formed within the mold will result in the first portion 24, the second portion 26, and the third portion 36

Referring to FIG. 13, the body 22 of a coating applicator 20 can also be created using separate sections. A body can be created, for example, by using three separate bodies or portions 26, 28, 30. A first section 28 of a cylindrical shape is located at a first end and a second section 30 is located at a second end. These two cylindrical shapes have a matching, outer diameter. These two sections 28, 30 form the first portion 24 of die shape. The second portion 26 of the body is a third separate portion having a diameter that is different than the first portion 24. The second portion 26 of the body is the portion between the first section 28 and the second section 30. The second portion 26 may create a surface, or a third portion, that is either angled or perpendicular to both the first and second portions of the body. When these three bodies are assembled on a shaft or central spool 42, they create a body that can parallel a variety of different channeled substrates. In one embodiment, the central spool 42 may include a first spool end portion 46 and a second spool end portion 48 as shown in FIG. 13.

Figure 14:
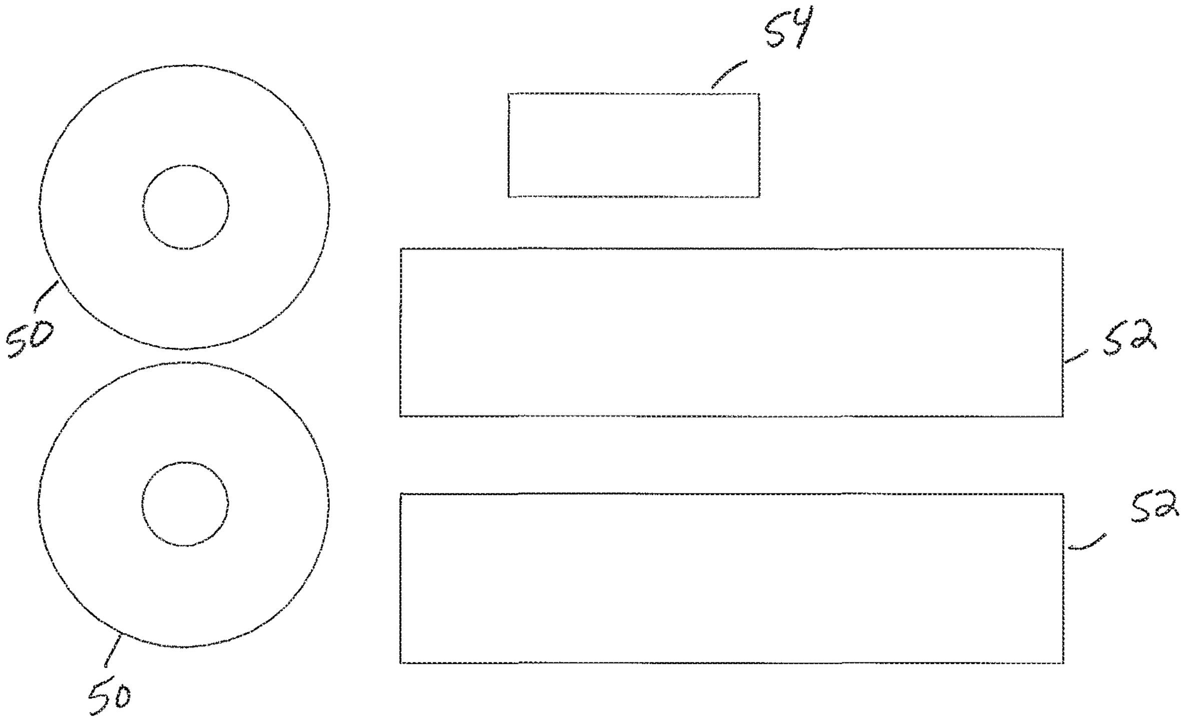
FIG. 14 is a top view of portions of a nap element for a coaling applicator in accordance with an embodiment of the present disclosure.

In one embodiment, referring to FIG. 14, a nap material or element may then be attached to the first, second, and third portions of the body. This nap material may be cut or otherwise fabricated to fit the first, second, and third portions of the body. In other words, the nap material may be cut into a first shape 50, a second shape 52, and a third shape 54 as shown in FIG. 14. In one embodiment, the attachment process of the nap material may be done on the body after the entire body has been formed. Alternatively, when the body is assembled with a series of sections that create the first, second, and third portions, the nap can be attached prior to the assembling of the sections. In one embodiment, a method of forming a coating applicator may include forming sections of a nap element that are configured to conform to the geometric shapes of the coating applicator.

FIGS. 18-44 illustrate additional exemplary embodiments of the present disclosure These exemplary embodiments include systems for advantageously providing a fluid to a fluid applicator as described herein.

Figure 44:
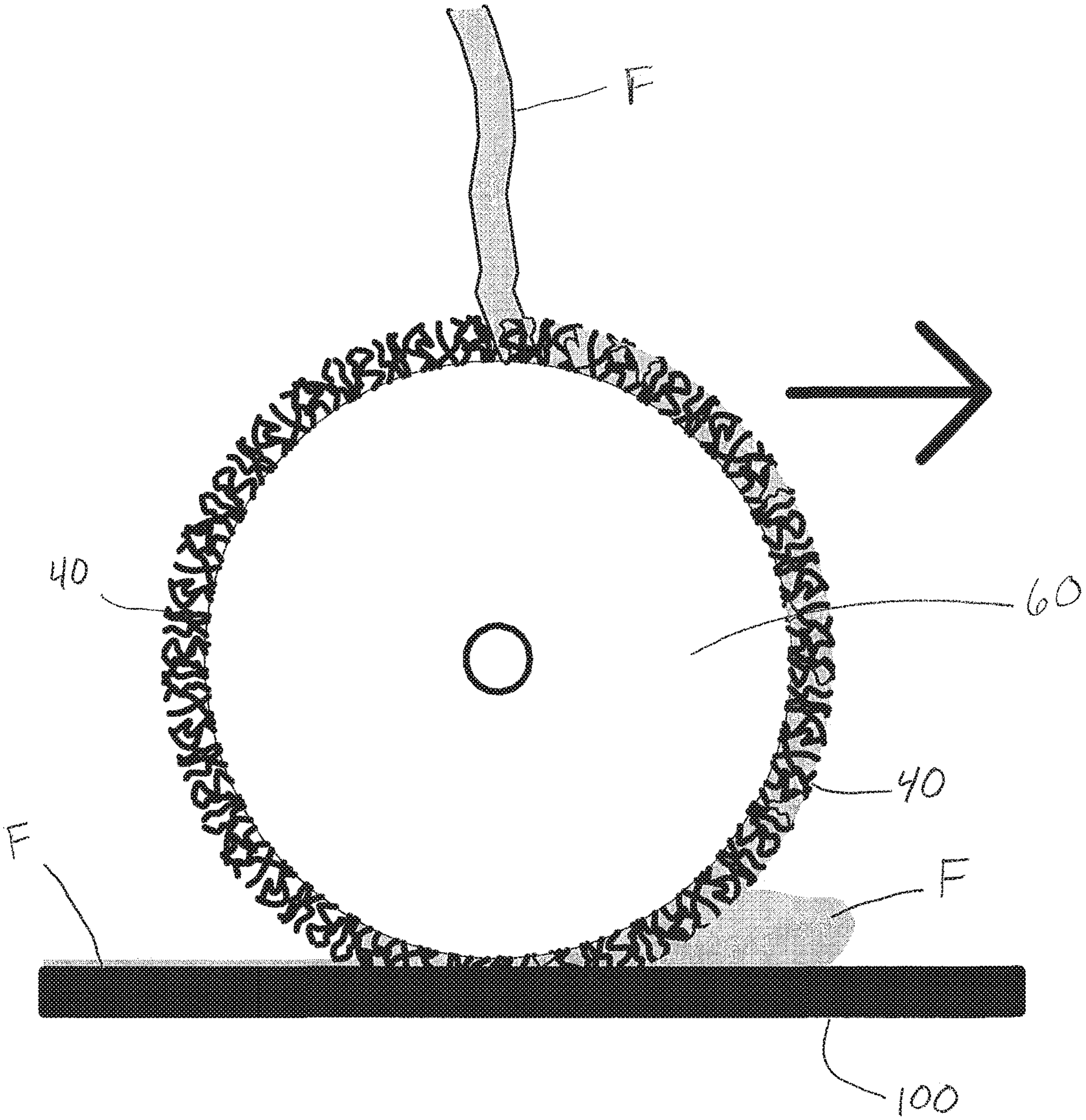
FIG. 44 is a perspective view of a fluid application system in accordance with an embodiment of the present disclosure.

Referring to FIG. 44, when applying a stream of a fluid F, or coating C, to a fluid applicator 60, such as a roller, having a plurality of flexible elements 40 forming a nap element, while the flexible elements 40 are in a non-deformed position, the fluid F fills the gaps and voids of the nap fibers. Then as the fluid applicator 60 moves or turns the flexible elements 40, e.g, the nap, the fluid F is moved to a surface or substrate 100 and the fluid F is applied to the surface 100. For example, as the nap encounters the surface 100, the nap is deformed, and the voids squeeze out the fluid F. To refill the voids and gaps of a nap, additional streams of a coating or fluid F can be supplied to the fluid applicator 60.

FIGS. 18-28 illustrate exemplary embodiments of the present disclosure. Referring to FIGS. 18-28, a fluid application system 120 for applying a fluid F to a substrate or surface 100 generally includes a fluid applicator 122, a fluid dispensing portion 124, a mixing portion 126, and a carrier 200.

In one embodiment, the fluid applicator 122 for applying the fluid F to the substrate 100 is removably attachable to the carrier 200 and includes a body 130. Referring to FIGS. 18-28, in one embodiment, the body 130 of the fluid applicator 122 is flat, e.g., the body 130 is cylindrical.

Figure 28:
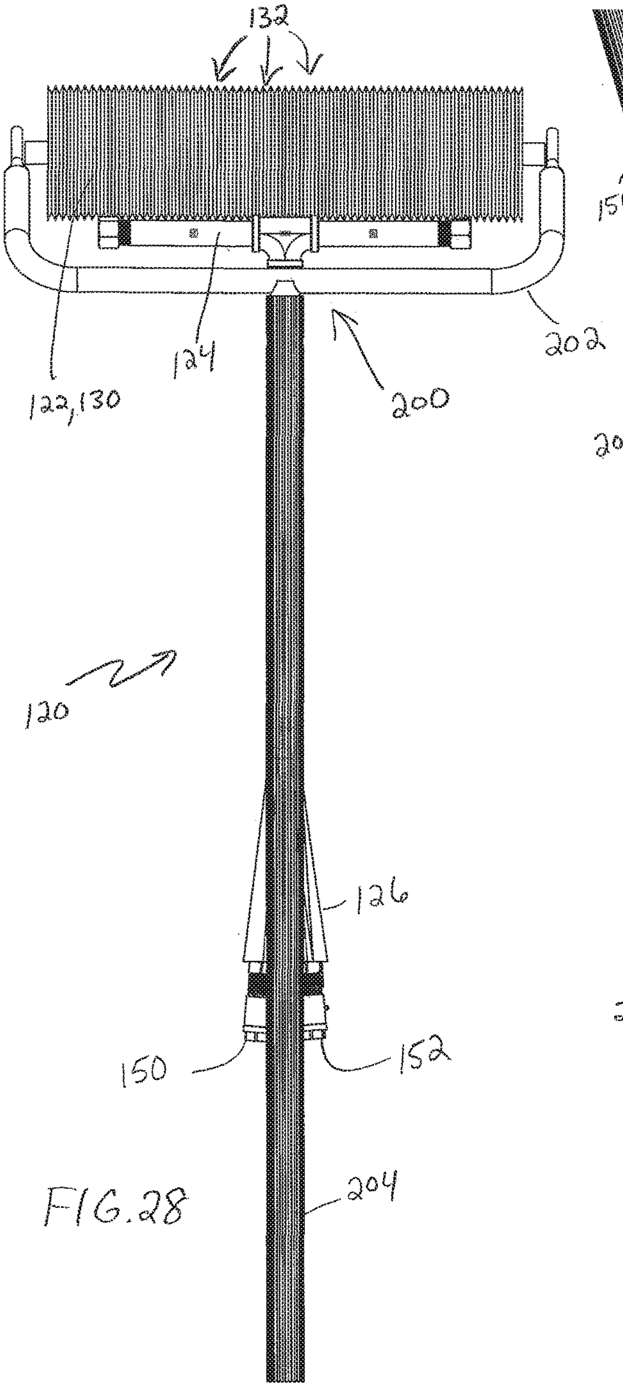
FIG. 28 is a side elevation view of a fluid application system in accordance with an embodiment of the present disclosure.
Figure 27:
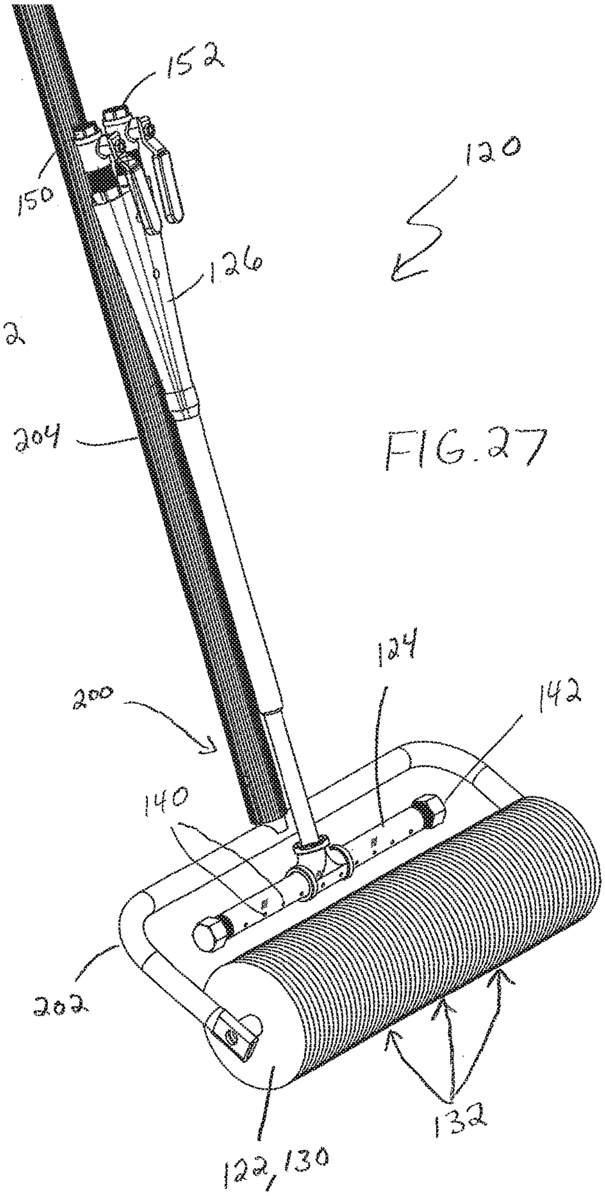
FIG. 27 is a perspective view of a fluid application system in accordance with an embodiment of the present disclosure.

Referring to FIGS. 27-28, in one embodiment, the body 130 of the fluid applicator 122 includes notched portions 132. The notched portions 132 allow a fluid F, or a coating C, to fill the notches portions 132 when applying a stream of a fluid F to a fluid applicator 122. In this manner, as a fluid applicator 122 turns and rolls along a surface, the fluid F in the notches 132 rolls down each notch and is delivered to a surface, e.g., a surface 100. For example, as the fluid applicator 122 rolls over the surface 100, the peaks of the notches 132 contact the surface 100, and the notches 132 allow a restricted amount of fluid F to be applied to the surface 100. The notches 132 provide a predefined restriction of fluid F that is applied to the surface 100. The larger the notches 132, the more fluid F is applied to a surface 100. Manufacturers of fluids specify the coverage rates in gallons per 100 square feet. These specifications can be met by using the proper sized notched squeegee or notched squeegee roller or other notched fluid applicator. The size of the notches will determine the fluid application rate. Common notch sizes include 1/16 of an inch, 1/8 of an inch, 3/16 of an inch, and 1/4 of an inch.

The fluid dispensing portion 124 provides a mechanism for applying and supplying the fluid F to the fluid applicator 122. In one embodiment, the fluid dispensing portion 124 is removably attachable to the carrier 200 and includes a plurality of ports or apertures 140. For example, in one embodiment, the fluid dispensing portion 124 includes a dispensing rod or tube 142 defining a plurality of apertures 140. In this manner, a fluid F is provided through the fluid dispensing portion 124 and out the plurality of apertures 140 thereby applying and supplying the fluid F to a fluid applicator 122.

Figure 22:
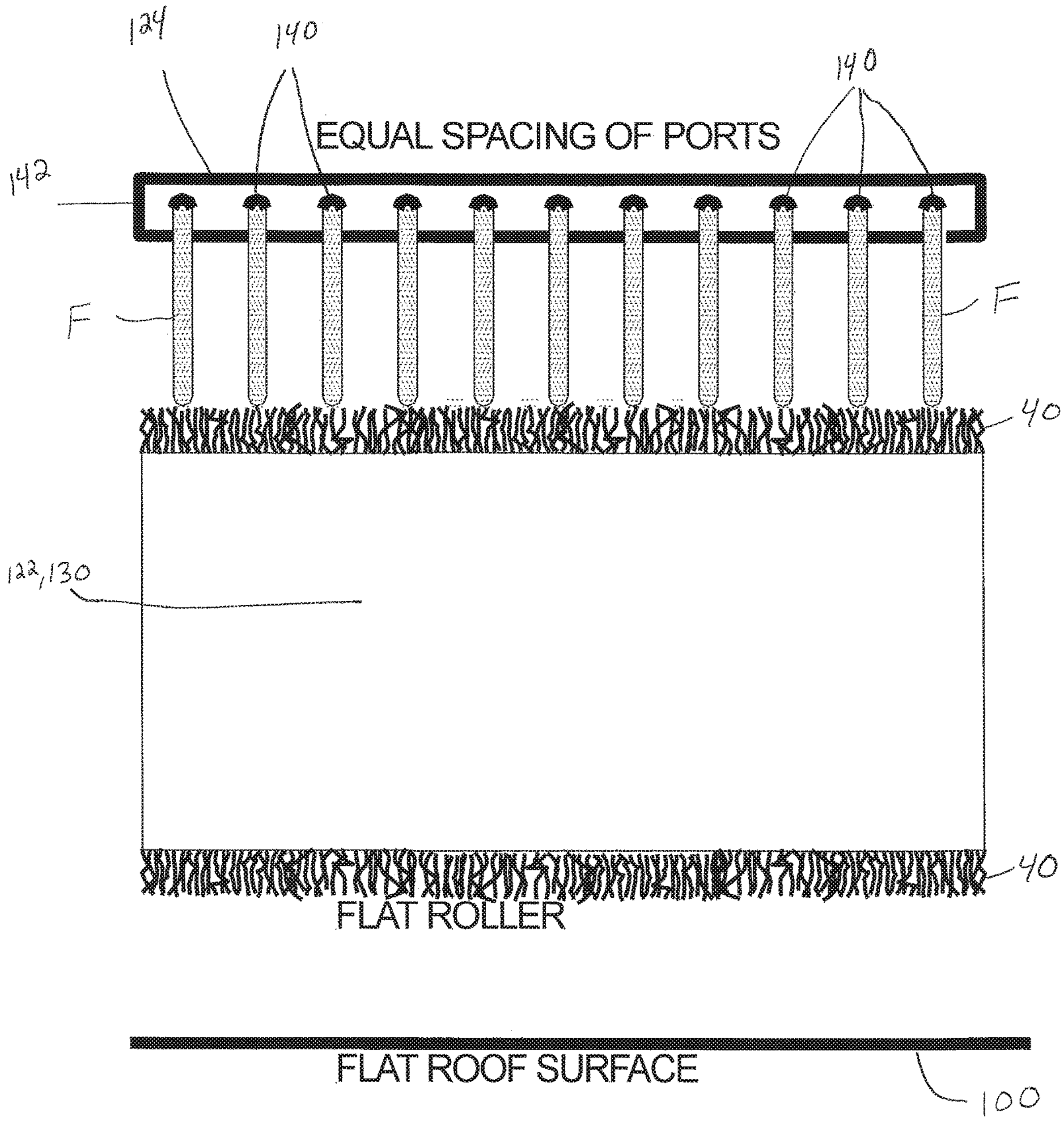
FIG. 22 is an elevation view of a fluid application system in accordance with an embodiment of the present disclosure exploded from a substrate.

Referring to FIG. 22, in one embodiment, the plurality of apertures 140 defined by the fluid dispensing portion 124 are spaced an equal distance apart. On a flat surface 100 with a flat or cylindrical fluid applicator 122 the streams of fluid F being applied from the apertures 140 of the fluid dispensing portion 124 can be spaced equally to provide a consistent application of coating or fluid F from the fluid applicator 122 to the substrate 100.

Figures 18, 19, 20, 21:
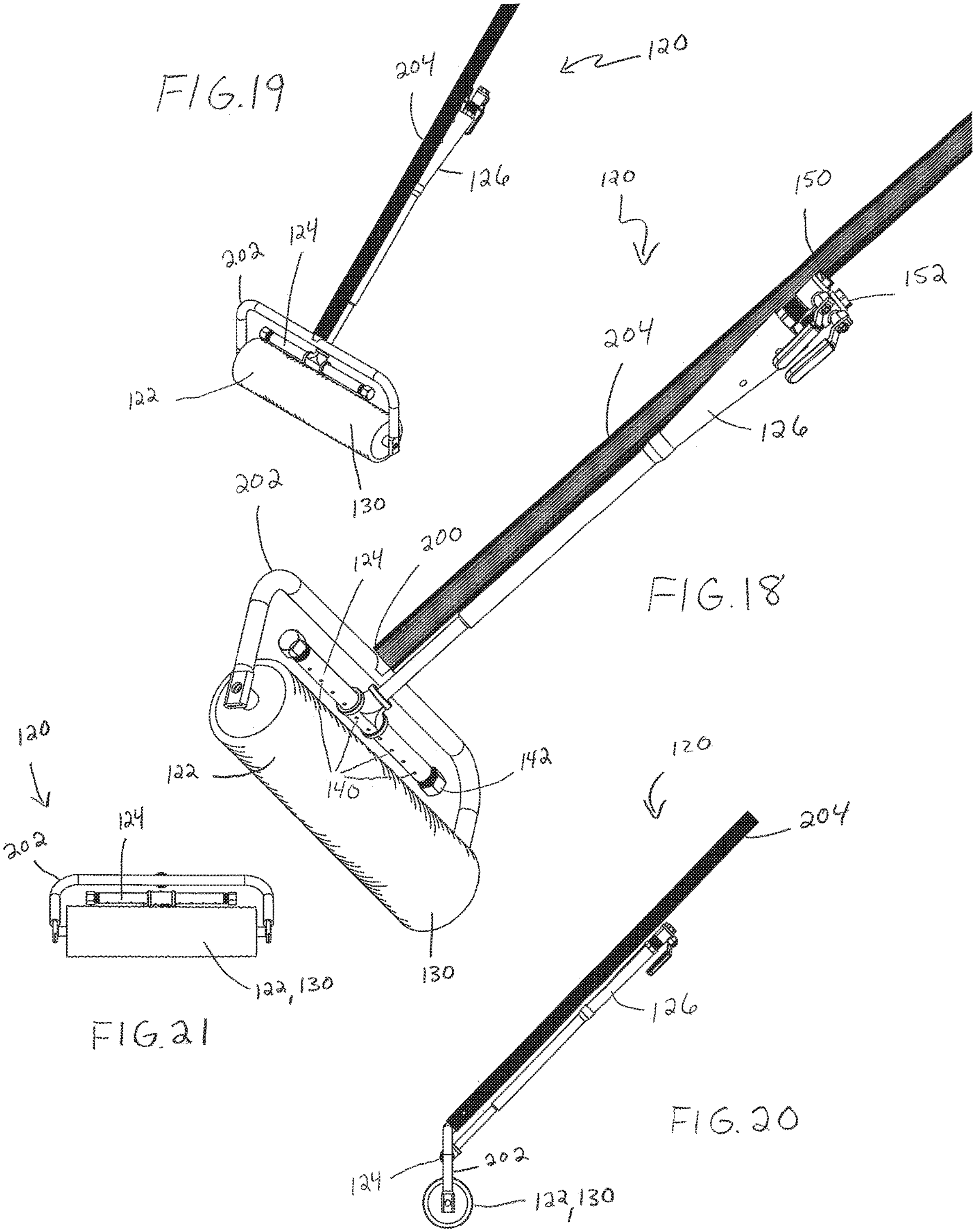
FIG. 18 is a perspective view of a fluid application system in accordance with an embodiment of the present disclosure.
FIG. 19 is a perspective view of a fluid application system in accordance with an embodiment of the present disclosure.
FIG. 20 is a side elevation view of a fluid application system in accordance with an embodiment of the present disclosure.
FIG. 21 is an elevation view of a fluid application system in accordance with an embodiment of the present disclosure.

Referring to FIGS. 18-2.8, an advantage of the present disclosure is that the fluid dispensing portion 124 is disposed outside and away from the fluid applicator 122. For example, the fluid dispensing portion 124 is spaced a length away from the fluid applicator 122.

If an outlet port of a dispensing tube is placed in close proximity or touching a roller, then the nap, fibers, or bristles and the fluid application system negatively impact the performance of the roller. The fluid needs to flow freely onto the roller without inhibiting the rollers performance. Also, when the outlet port of a dispensing tube is placed in close proximity or touching a roller, the nap or fibers obstruct the ports thereby clogging and blocking the ports. Residue on the roller can begin to cure or dry out so the supply line will also dry out thus stopping the flow of a fluid from the dispensing tube to the roller.

In an exemplary embodiment of the present disclosure, the fluid dispensing portion 124 is approximately at least ¼ of an inch away from the surface of the fluid applicator 122 but net more than approximately 5 inches. When the dispensing portions are a distance of greater than approximately 5 inches the stream of the fluid can be easily disrupted by the moving action of the application system as it applies the fluid to the substrate. A bump in the substrate, for instance, can cause the stream to flow errantly. Additionally, when the distance is greater than approximately 5 inches then foreign objects such as dust can contaminate the fluid. Long streams are also susceptible to disruption by wind causing the stream to miss the fluid applicator.

Other conventional methods include filling the inside of a roller or brush. The fluid then travels out of openings in the roller to the roller nap or bristles. These conventional methods have several disadvantages. The cost of special rollers or brushes is higher than a standard roller or brush. The cost of the special fluid tubing is required to both allow the flow of fluid and provide a structure that is able to withstand the rigors of a hand application device. Tins special arrangement is complicated, more difficult to use, and more costly. The fluid on the inside surface of the roller can cause the roller or brush sleeve to be bonded to the frame. This is especially true if the fluid is an adhesive or two part component substance. Rollers can quickly become ruined as the two part component material cures. The tube delivering the fluid to the inside of the applicator is necessarily in contact with the applicator itself. This arrangement provides an additional opportunity for clogging as the surfaces of the applicator and the surfaces of the delivery tube become coated with curing liquid.

In one embodiment, the mixing portion 126 is removably attachable to a carrier 200 and is in fluid communication with the fluid dispensing portion 124. In one embodiment, the mixing portion 126 receives a first part of the fluid F via a first port 150 and a second part of the fluid 1 via a second port 152 and mixes the first part and the second part theretogether to create a mixed fluid. As the mixing portion 126 is in fluid communication with the fluid dispensing portion 124, the plurality of apertures 140 can then be used to apply the fluid F having the first part and the second part mixed theretogether to the fluid applicator 122. In one embodiment, the mixing portion 126 may be a Vee. Manifold available from Rooftop Equipment Inc. and described in U.S. patent application Ser. No. 13/804,748, U.S. Pat. No. 9,242,846, entitled 'Vee Manifold", the entirety of which is hereby incorporated by reference herein In one embodiment, referring to FIGS. 18-28, a fluid application system 120 of the present disclosure includes a carrier 200 having a frame portion 202 and a handle portion 204, as described in further detail above and with reference to FIGS. 8 and 9.

As described above, referring to FIG. 22, in one embodiment, the plurality of apertures 140 defined by the fluid dispensing portion 124 are spaced an equal distance apart. On a flat surface 100 with a flat or cylindrical fluid applicator 122 the streams of fluid F being applied from the apertures 140 of the fluid dispensing portion 124 can be spaced equally to provide a consistent application of coating or fluid F from the fluid applicator 122 to the substrate 100.

For example, in an exemplary embodiment, a fluid applicator 122 may be 12 inches in length and a material or fluid F may be applied from the nap of the fluid applicator 122 to a flat substrate, and the fluid applicator 122 is flat and matches the flat substrate. A cross-sectional view of the substrate reveals 12 inches across the horizontal substrate measurement and 12 inches across the fluid applicator 122. Streams of fluid F being applied to a nap of such a flat fluid applicator 122 are spaced equally to provide a consistent application of fluid F from the fluid applicator 122 to the substrate. For instance, a 12 inch fluid dispensing portion 124 with 12 ports or apertures 140 is secured parallel to the axle of the fluid applicator 122 and about 2 inches away from the nap of the fluid applicator 122. Referring to FIG. 22, for example, the 12 ports or apertures 140 spaced 1 inch on center and the first port located one-half inch from each end of the fluid dispensing portion 124. The 1 inch on center streams provide sufficient coating to the voids of the roller nap to apply the desired mill thickness of fluid F to the substrate.

FIGS. 29-34 illustrate exemplary embodiments of the present disclosure. Referring to FIGS. 29-34, a fluid application system 320 for applying a fluid 1 to a substrate or surface 100 generally includes a fluid applicator 322, a fluid dispensing portion 324, and a carrier 200. A fluid application system 320 of the present disclosure solves problems associated with providing coatings or fluids to rollers or applicators and to substrates having contoured surfaces. As described in more detail below, FIG. 29 relates to an embodiment having apertures or ports spaced apart different distances and FIGS. 33-34 relate to embodiments having apertures or ports having different diameters.

Equal spacing of the ports or apertures that provide a coating or fluid F to a roller do not provide sufficient coating for rollers and substrates having contoured surfaces. For example, in an exemplary embodiment, when a roller and/or surface to be coated is contoured, such as a metal roof, the cross-sectional view reveals 12 inches across the horizontal, but the linear measurement of the substrate is 16 inches. The greater distance is due to the contoured portion. If the same 12 streams of equally spaced coating, as described above with respect to a flat applicator, are applied to a contoured roller, then there is not enough coating or fluid being applied to the roller or applicator and consequently to the contoured surfaces of the substrate to provide the desired mill thickness of fluid to the substrate. The 1 inch on center ports providing 1 inch on center streams will contact the angled surface at approximately 1⅓ inches thereby leaving a film thickness that is insufficient. The result is that a substrate can be seen through the inadequately thin layer of coating or fluid applied. A white coating being applied over gray metal will appear gray on the ribs due to the inadequately thin layer of fluid applied.

A fluid application system 320 of the present disclosure solves these problems associated with providing coatings or fluids to rollers or applicators and to substrates having contoured surfaces as described in more detail below.

In one embodiment, the fluid applicator 322 for applying the fluid F to the substrate 100 is removably attachable to the carrier 200 and includes a body 330 having a first portion 24 and a second portion 26, as described in further detail above and with reference to FIGS. 2A-7, As described above, in one embodiment, the first portion 24 has a first contoured surface 32 and the second portion 26 has a second contoured surface 34 different than the first contoured surface 32.

Figure 29:
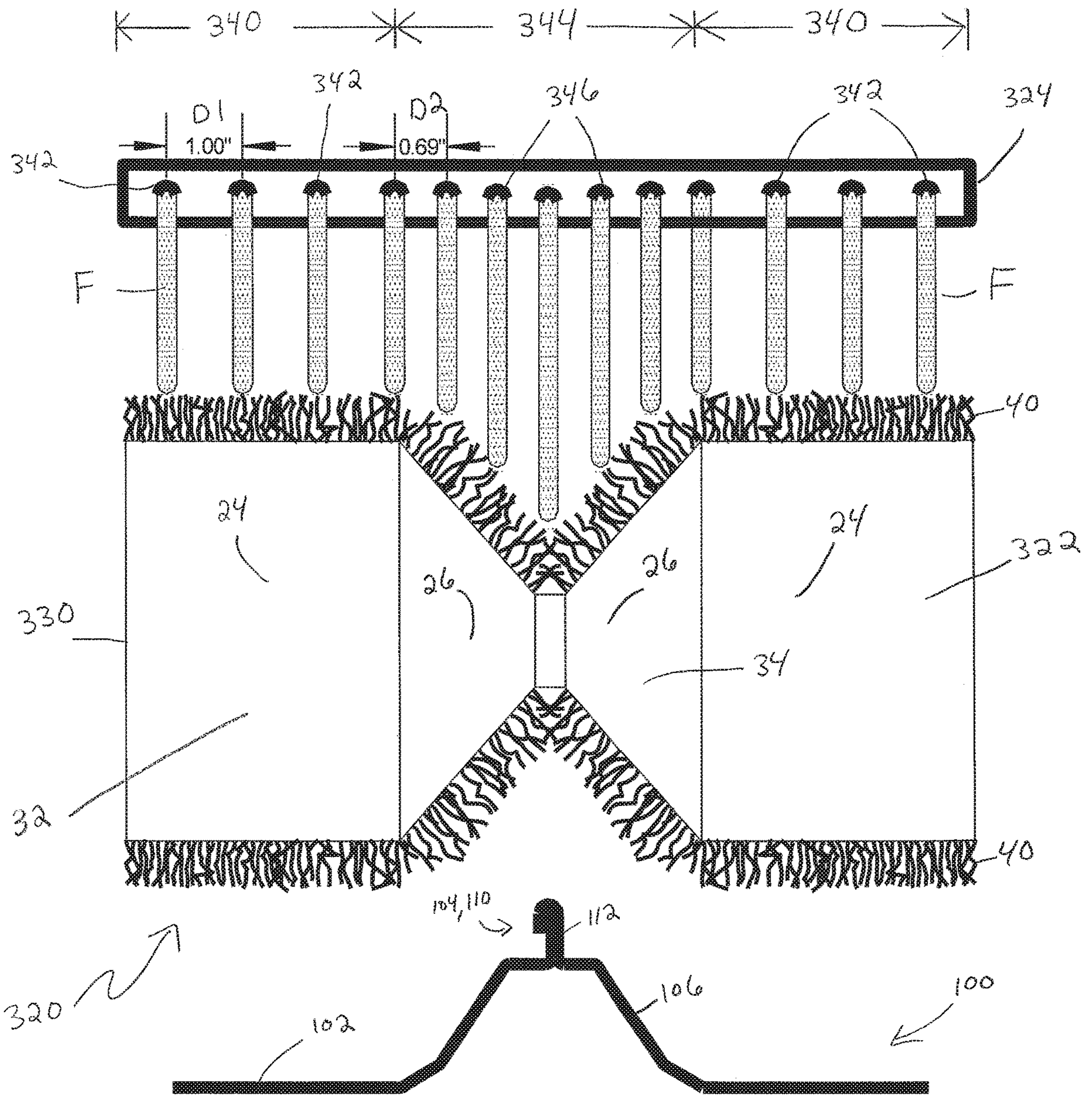
FIG. 29 is an elevation view of a fluid application system in accordance with another embodiment of the present disclosure exploded from a substrate.

The fluid dispensing portion 324 provides a mechanism for applying and supplying the fluid F to a fluid applicator 322 having contoured surfaces. In one embodiment, the fluid dispensing portion 324 is removably attachable to the carrier 200 and includes a first section 340 including a plurality of first section apertures 342 and a second section 344 including a plurality of second section apertures 346. Referring to FIG. 29, the first section apertures 342 apply the fluid F to the first portion 24 of the fluid applicator 322 and the second section apertures 346 apply the fluid F to the second portion 26 of the fluid applicator 322.

Referring to FIG. 29, in one embodiment, the first section apertures 342 are spaced a first distance D1 apart and the second section apertures 346 are spaced a second distance D2 apart, and the second distance D2 is less than the first distance D1. In tins manner, a fluid dispensing portion 324 of the present disclosure advantageously applies and supplies an appropriate, sufficient, and consistent amount of a fluid F to all portions of a fluid applicator including all of the different contoured surfaces of the fluid applicator. By properly supplying a fluid F to a fluid applicator in this manner ensures that the fluid applicator then property coats a substrate with the desired fluid.

Referring to FIG. 29, in one exemplary embodiment, the first section apertures 342 are spaced 1 inch apart and the second section apertures 346 are spaced 0.69 inches apart. In other exemplary embodiments, other distances between the apertures 342, 346 can be used to accommodate other fluid applicators 322 and substrates 100 having any variety of different contoured surfaces using the techniques described in the present disclosure In this manner, a fluid dispensing portion 324 of the present disclosure advantageously applies and supplies an appropriate, sufficient, and consistent amount of a fluid to all portions of a fluid applicator including all of the different contoured surfaces of the fluid applicator. By properly supplying a fluid F to a fluid applicator in this manner ensures that the fluid applicator then property coats a substrate with the desired fluid.

For example, the spacing of the ports or apertures 342, 346 of the fluid dispensing portion 324 of the present disclosure ensures streams of fluid F that contact a contoured fluid applicator 322 at a spacing that sufficiently accommodates all of the contours of the fluid applicator 322 and the contoured surface. This spacing of the ports or apertures 342, 346 of the fluid dispensing portion 324 of the present disclosure ensures that the proper streams of fluid F are supplied and at the proper distances for proper fluid coverage for every surface of the applicator and the substrate, e.g., at each of the flat and the contoured surfaces. In an exemplary embodiment, for example, a contour having a cross sectional view with 16 linear inches of nap to accommodate the 16 inches of surface in 12 inches of horizontal distance will have about 14 streams of coating. The ports and streams on the flat surface will have equal spacing, for example, 1 inch on center, while the ports and streams associated with the contoured surface with be about ⅔ of an inch on center.

In another exemplary embodiment, for example, if a roller is 11 inches in length when applying material from the roller nap to a flat substrate, the surface of the roller is parallel to the substrate. A cross-sectional view of the surface reveals 11 inches across the horizontal substrate measurement and 11 inches across the roller. But when a surface is contoured, such as a metal roof, the cross-sectional view reveals 11 inches across the horizontal but a linear measurement of the substrate is 16 inches with more distance being at the contoured or angled portions. A fluid applicator that has been adapted to this contour will also have a cross sectional view with 16 inches. If streams of coating or fluid are provided by a straight row of ports having equal spacing the fluid applicator will not have sufficient coating on the contoured or angled portions. Ports must be moved closer together to accommodate the 16 inches of the substrate over the horizontal 11 inches, for example.

Figure 30:
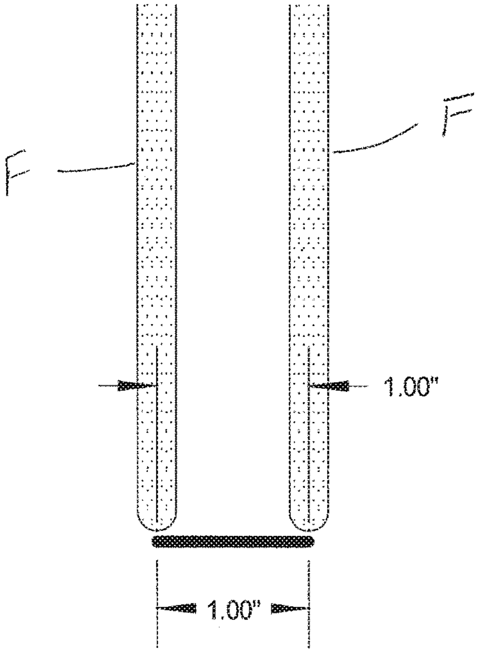
FIG. 30 is a schematic view of spacing dimensions for a fluid application system in accordance with an embodiment of the present disclosure.
Figure 31:
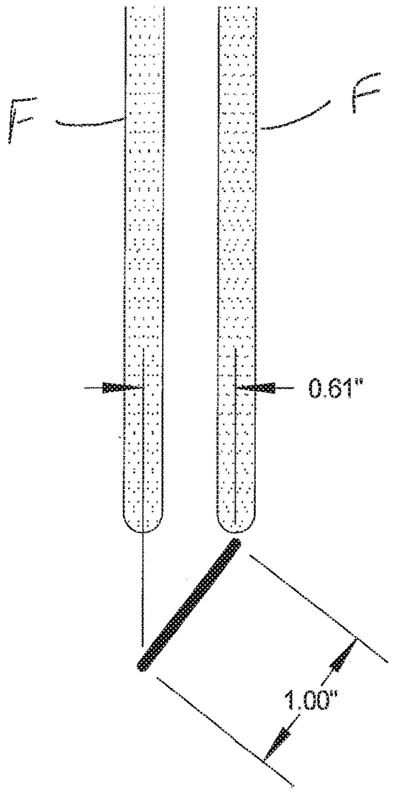
FIG. 31 is a schematic view of spacing dimensions for a fluid application system in accordance with an embodiment of the present disclosure.
Figure 32:
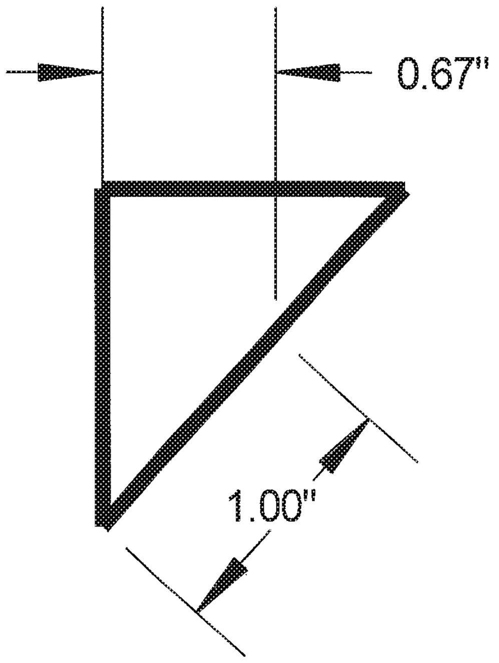
FIG. 32 is a schematic view of spacing dimensions for a fluid application system in accordance with an embodiment of the present disclosure.

Referring to FIG. 30-32, illustrations of the required spacing of fluid streams to ensure proper coverage for horizontal surfaces and contoured or angled surfaces are shown. If streams of coating or fluid are delivered to a contoured roller by a row of ports having equal spacing, the applicator will not have sufficient coating on the contoured or angled portions.

Figure 33:
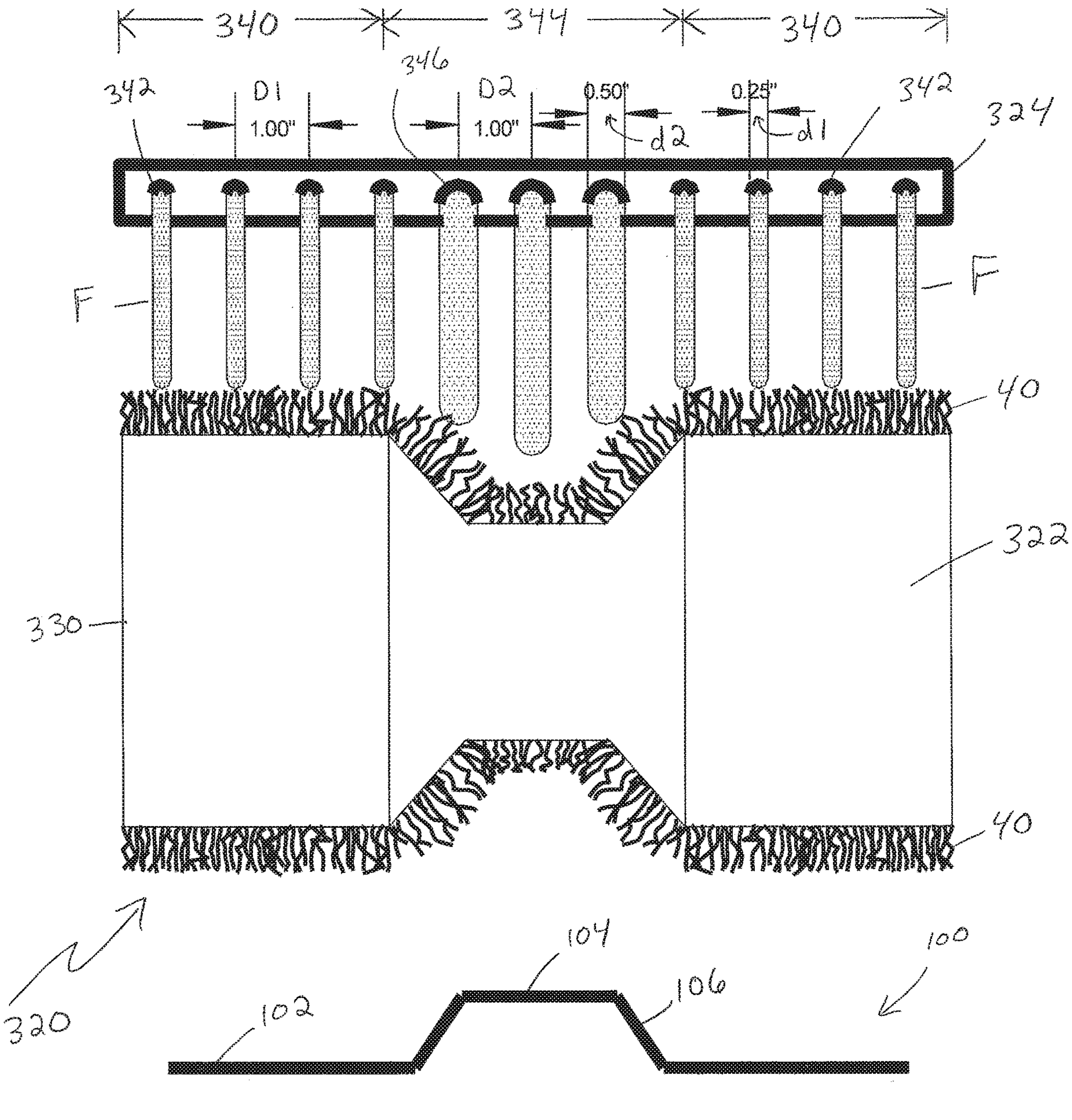
FIG. 33 is an elevation view of a fluid application system in accordance with another embodiment of the present disclosure exploded from a substrate.
Figure 34:
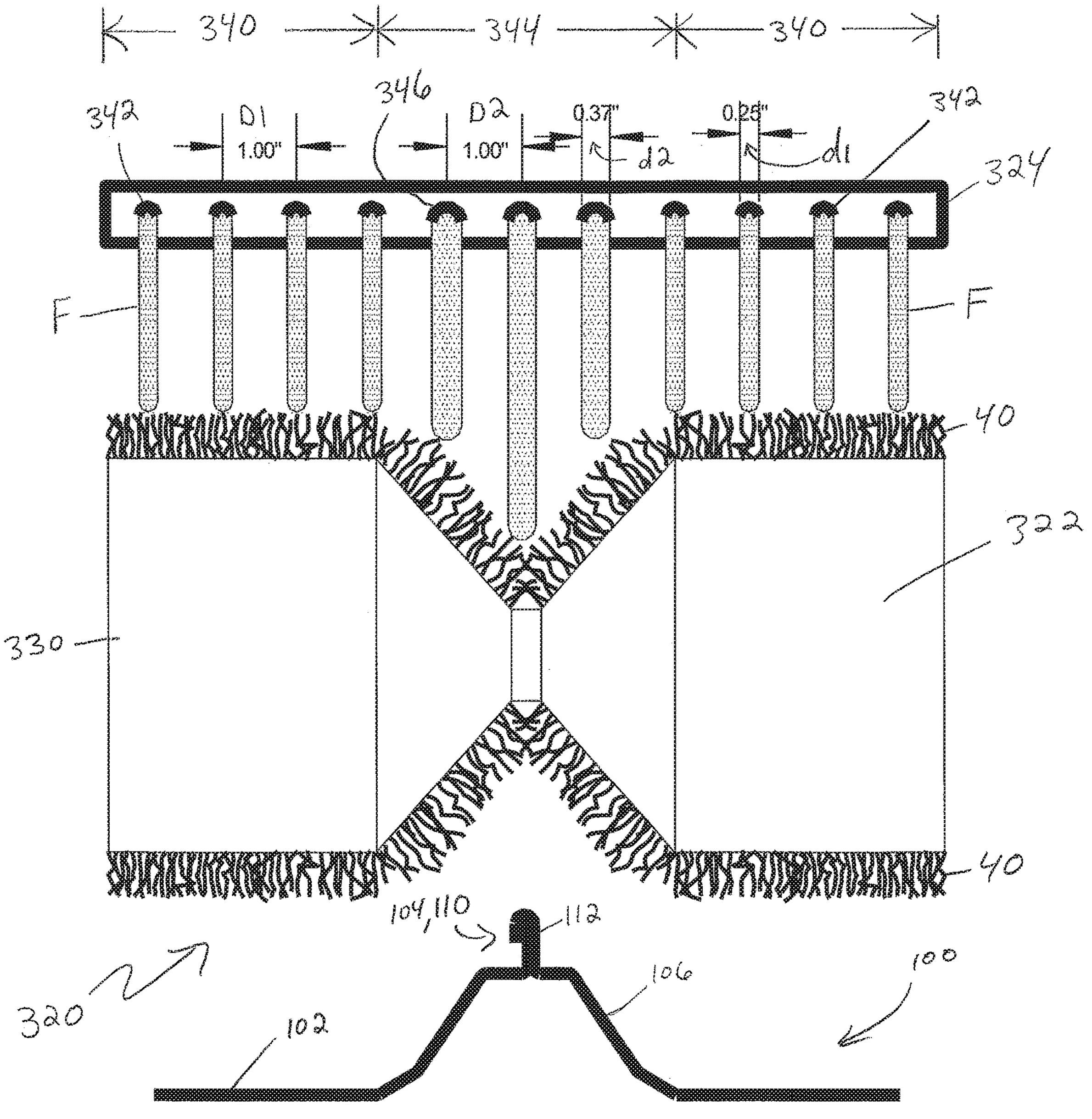
FIG. 34 is an elevation view of a fluid application system in accordance with another embodiment of the present disclosure exploded from a substrate

Referring to FIGS. 33-34, in some embodiments, the fluid dispensing portion 324 is removably attachable to the carrier 200 and includes a first section 340 including a plurality of first section apertures 342 and a second section 344 including a plurality of second section apertures 346. Referring to FIGS. 33-34, the first section apertures 342 apply the fluid F to the first portion 24; of the fluid applicator 322 and the second section apertures 346 apply the fluid F to the second portion 26 of the fluid applicator 322. Referring to FIGS. 33-34, in some embodiments, the first section apertures 342 have a first diameter d1 and the second section apertures 346 have a second diameter d2, wherein the second diameter d2 is greater than the first diameter d1.

Referring to FIG. 33, in one embodiment, the first section apertures 342 have a first diameter d1 of 0.25 inches and the second section apertures 346 have a second diameter d2 of 0.5 inches. Referring to FIG. 34, in one embodiment, the first section apertures 342 have a first diameter d1 of 0.25 inches and the second section apertures 346 have a second diameter d2 of 0.37 inches. In this manner, for the reasons discussed above, more fluid is applied to portions of the fluid applicator 322 and the substrate 100 that have contoured or angled portions.

In other exemplary embodiments, other diameters of the apertures 342, 346 can be used to accommodate other fluid applicators 322 and substrates 100 having any variety of different contoured surfaces using the techniques described in the present disclosure. In this manner, a fluid dispensing portion 324 of the present disclosure advantageously applies and supplies an appropriate, sufficient, and consistent amount of a fluid F to all portions of a fluid applicator including all of the different contoured surfaces of the fluid applicator. By properly supplying a fluid F to a fluid applicator in this manner ensures that the fluid applicator then properly coats a substrate with the desired fluid.

As shown in FIGS. 33 and 34, in some embodiments, by varying the diameters of the apertures 342, 346, the first section apertures 342 are spaced a first distance apart and the second section apertures 346 are spaced a second distance apart, wherein the first distance is equal to the second distance. By varying the diameters, the distances the apertures 342, 346 are apart can be the same.

In other embodiments, by varying the diameters of the apertures 342, 346, the first section apertures 342 are spaced a first distance apart and the second section apertures 346 are spaced a second distance apart, wherein the first distance is less than the second distance. In ocher embodiments, by varying the diameters of the apertures 342, 346, the first section apertures 342 are spaced a first distance apart and the second section apertures 346 are spaced a second distance apart, wherein the second distance is less than the first distance.

The embodiments shown in FIGS. 29, 33, and 34 can also include a mixing portion 126 as described in detail above. As described above, in one embodiment, the mixing portion 126 receives a first part of the fluid F via a first port 150 and a second part of the fluid F via a second port 152 and mixes the first part and the second part theretogether to create a mixed fluid.

Figure 35:
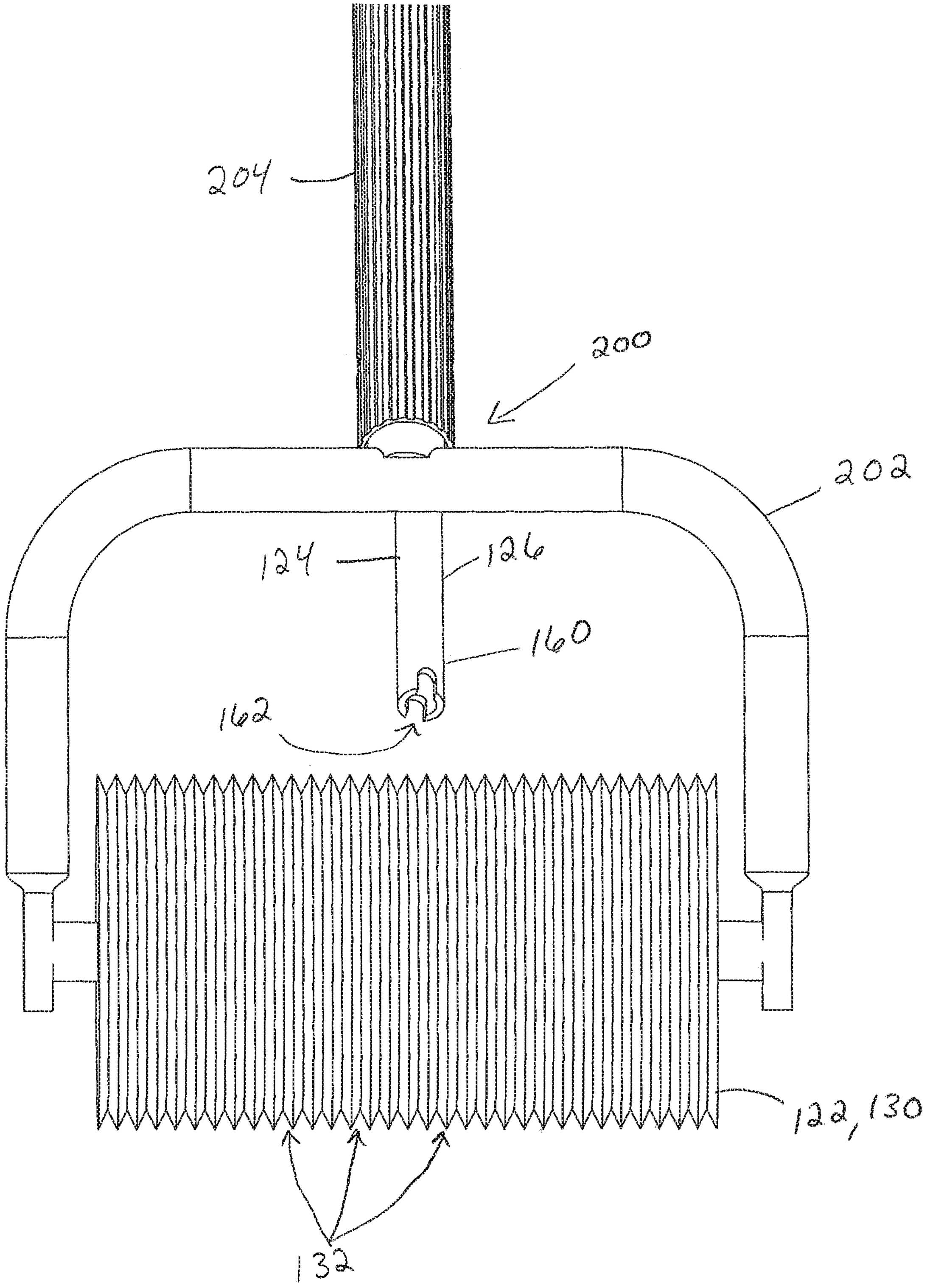
FIG. 35 is an elevation view of a fluid application system in accordance with an embodiment of the present disclosure exploded from a substrate.

Referring to FIG. 35, in some embodiments, a fluid dispensing portion 124 of the present disclosure includes a single outlet or aperture that can be used as a mechanism for applying and supplying the fluid F to a fluid applicator 122. For example, referring to FIG. 35, in one embodiment, a mixing portion 126 is removably attachable to a carrier 200 and includes a mixing tip 160. As described above, in one embodiment, the mixing portion 126 receives a first part of the fluid F via a first port 150 and a second part of the fluid F via a second port 152 and mixes the first part and the second part theretogether to create a mixed fluid. The mixing tip 160 applies the mixed fluid to the fluid applicator 122. In one embodiment, the mixing portion 126 comprises a vee manifold, as described in detail above. In one embodiment, the mixing tip 160 defines a single aperture 162.

The fluid application system of the present disclosure offers many advantageous benefits over conventional systems. For example, two component coatings or other fluids are commonly poured into a five gallon pad then mixed with a paddle mixer attached to a drill. These mixed fluids are then poured out of the pail onto the substrate. Once on the substrate the fluid is in large undesirable puddles which must be pushed and pulled with a squeegee, roller, or other applicator. Since the fluid is curing chemically the viscosity is getting greater as each moment passes. The effort to push or pull the fluid into an even film thickness becomes increasingly difficult with passing of each curing moment. Since many of these fluids have a pot life of only a few minutes improper spreading is hard to avoid. Prior art methods of applying these two-component fluids can also be accomplished using a single bead or ribbon of fluid being applied directly to the substrate flowing from a static mixing tip. While these beads do eliminate the need for mechanical stirring in a pail with a drill, the beads or ribbons that flow out of the static mixing tip and onto the substrate surface must still be pushed or pulled to form a continuous monolithic film of fluid. The problem with this method is that it leaves marks on the substrate in the shape of the bead. This happens because these fluids are becoming more viscous as the mixed fluid cures. The condition of the mixed fluid at the time it contacts the surface is different than the condition of the mixed and curing fluid at the time when an attempt is made to move the fluid with a squeegee or roller. Therefore, when the two-component fluid cures the pattern of the beads is transmitted through the fluid and the pattern of application can be seen. With the present invention the stream of the fluid flows onto a fluid applicator prior to contacting the surface. This eliminates the bead lines. The spreading of the mixed two component fluid by a fluid applicator as it flows from the mixing tip onto the fluid applicator and then onto the substrate provides an even monolithic distribution of fluid. It also decreases the length of time required from when the two fluids begin to chemically react and cure to the time where the mixed fluid has reached its' final position on the substrate. This time is very critical and especially when additional materials are to be broadcast into the wet fluid. Sand, walnut shells, or colored flakes are commonly called for in these applications. If the fluid cures prior to broadcasting the grains or flakes they will not embed into the fluid. These are meant to be a permanent part of the application but will be swept away if the fluid is cured prior to contact. The total pot life of many materials is 15 to 20 minutes. When the two components are mixed in a five gallon pail, then poured out onto the substrate, then pulled and pushed to spread out evenly, there is little time left to broadcast the final components into a wet fluid. Consequentially, the batches of mixing must remain small enough for all the steps to be accomplished prior to curing. This process is very time consuming. The present invention expedites the application time which leaves ample time to embed the finishing materials. This process is not only faster for each batch, but it also allows the application process to be continuously flowing rather than stopping and starting with each batch. This continuous flow greatly enhances the efficiency of the overall application process.

Referring to FIGS. 36-41, in some embodiments, a fluid dispensing portion 124 of the present disclosure includes multiple mixing portions 126 for applying and supplying the fluid F to a fluid applicator 122. For example, referring to FIGS. 36-41, in some embodiments, a fluid dispensing portion 124 includes a first mixing portion 170 that is removably attachable to a carrier 200 and includes a first mixing tip 172.

In one embodiment, a first mixing portion 170 receives a first part of the fluid F via a first port 150 and a second part of the fluid F via a second port 152 and mixes the first part and the second part theretogether to create a first mixed fluid. Referring to FIGS. 36-41, the first mixing tip 172 applies the first mixed fluid to the fluid applicator 122.

Referring to FIGS. 36-41, in some embodiments, a fluid dispensing portion 124 also includes a second mixing portion 174 that is removably attachable to the carrier 200 and includes a second mixing tip 176.

In one embodiment, a second mixing portion 174 receives a first part of the fluid F via a first port 150 and a second part of the fluid F via a second port 152 and mixes the first part and the second part theretogether to create a second mixed fluid. Referring to FIGS. 36-41, the second mixing tip 176 applies the second mixed fluid to the fluid applicator 122.

Referring to FIGS. 36-41, in some embodiments, a fluid dispensing portion 124 also includes a third mixing portion 178 that is removably attachable to the carrier 200 and includes a third mixing tip 180.

In one embodiment, a third mixing portion 178 receives a first part of the fluid via a first port 150 and a second part of the fluid F via a second port 152 and mixes the first part and the second part theretogether to create a third mixed fluid. Referring to FIGS. 36-41, the third mixing tip 180 applies the third mixed fluid to the fluid applicator 122.

Referring to FIGS. 36-41, in some embodiments, the first mixing portion 170, the second mixing portion 174, and the third mixing portion 178 each include a vee manifold, as described in detail above. Referring to FIGS. 36-41, in some embodiments, the first mixing tip 172, the second mixing tip 176, and the third mixing tip 180 each define only a single aperture.

Figure 36:
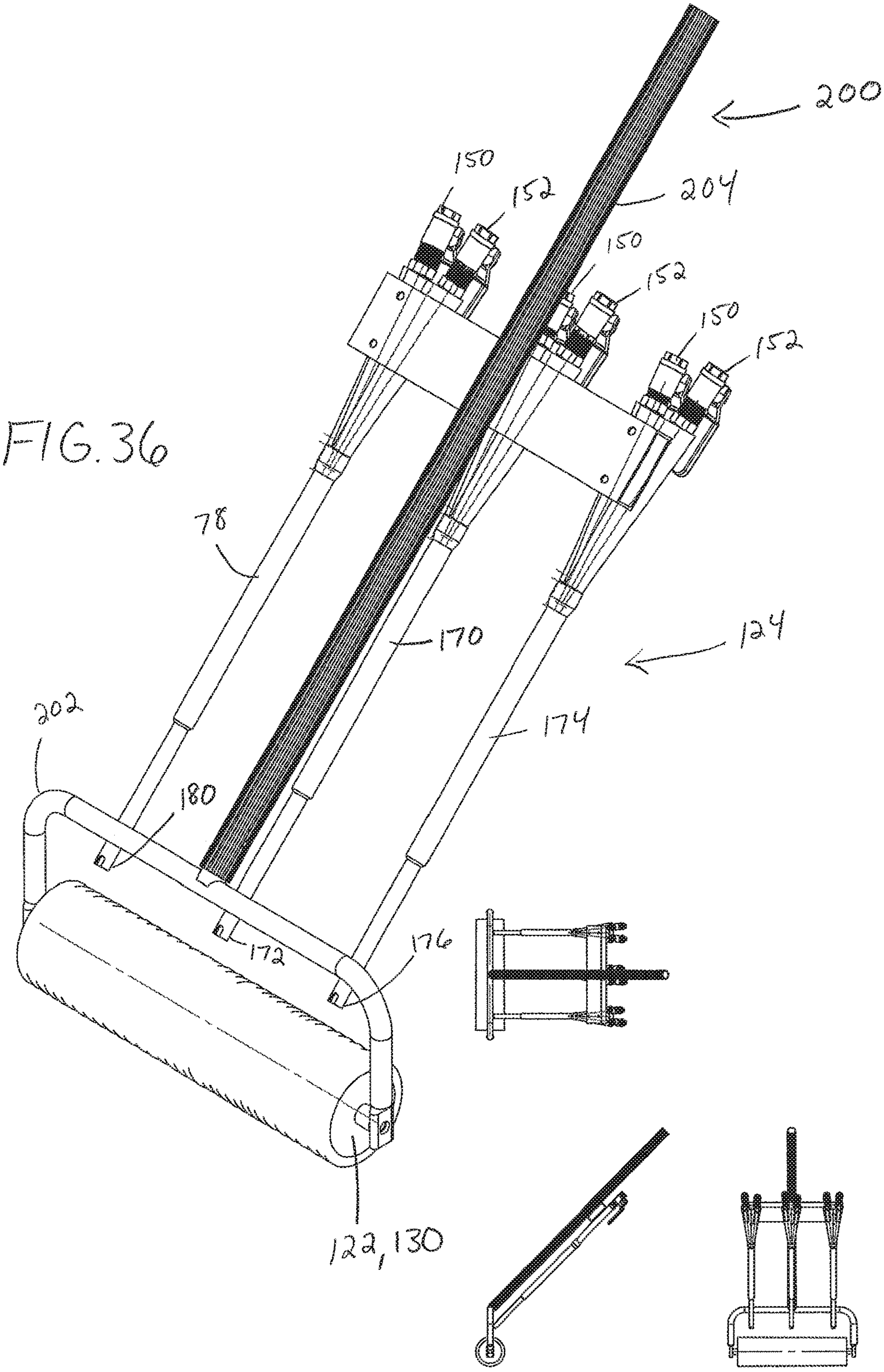
FIG. 36 is a perspective view of a fluid application system in accordance with an embodiment of the present disclosure.

Referring to FIG. 36, the first mixing portion 170, the second mixing portion 174, and the third mixing portion 178 are used with a fluid applicator 122 comprising a roller having a nap.

Figure 37:
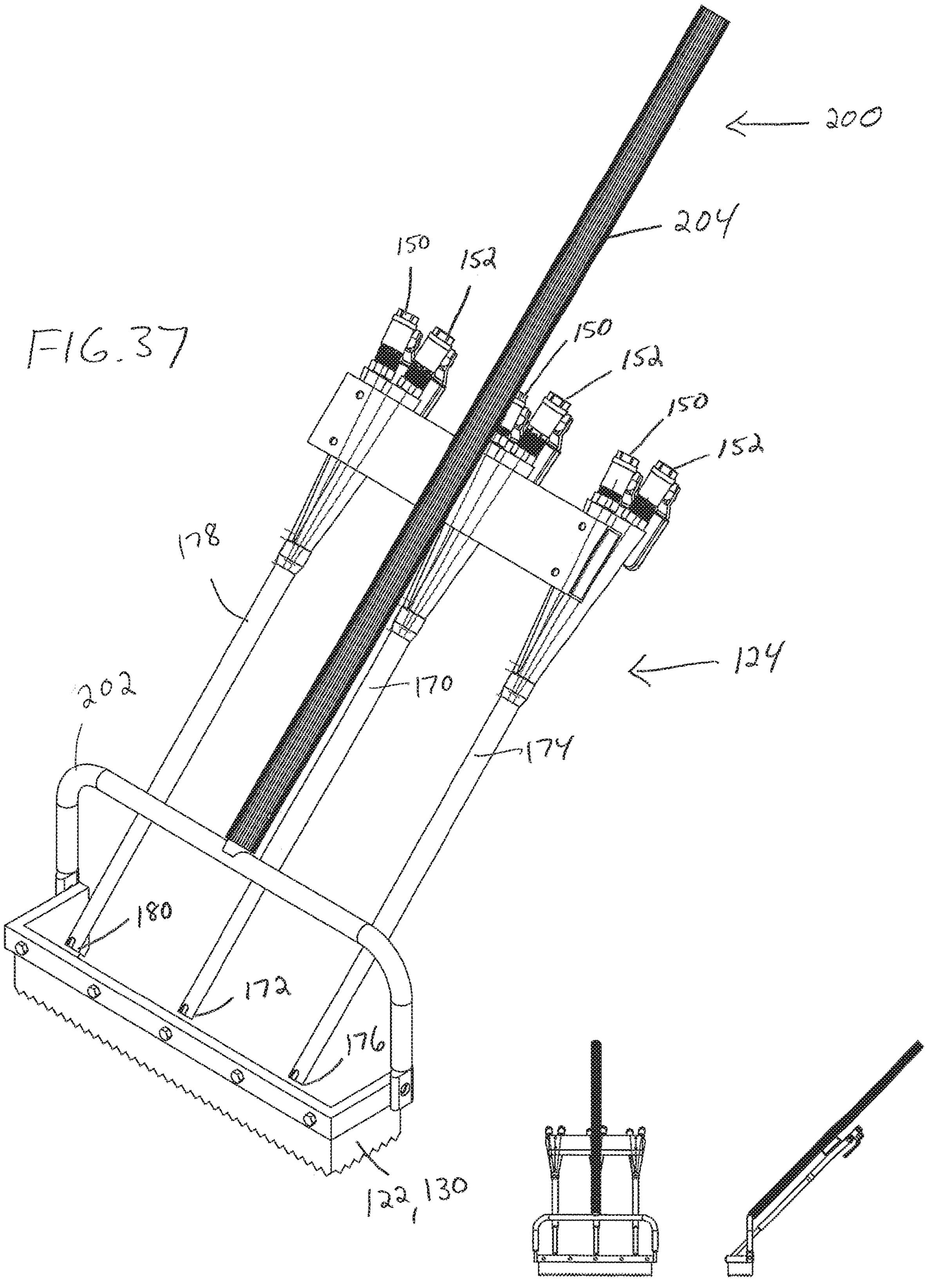
FIG. 37 is a perspective view of a fluid application system in accordance with an embodiment of the present disclosure.

Referring to FIG. 37, the first mixing portion 170, the second mixing portion 174, and the third mixing portion 178 are used with a fluid applicator 122 comprising a squeegee.

Figure 38:
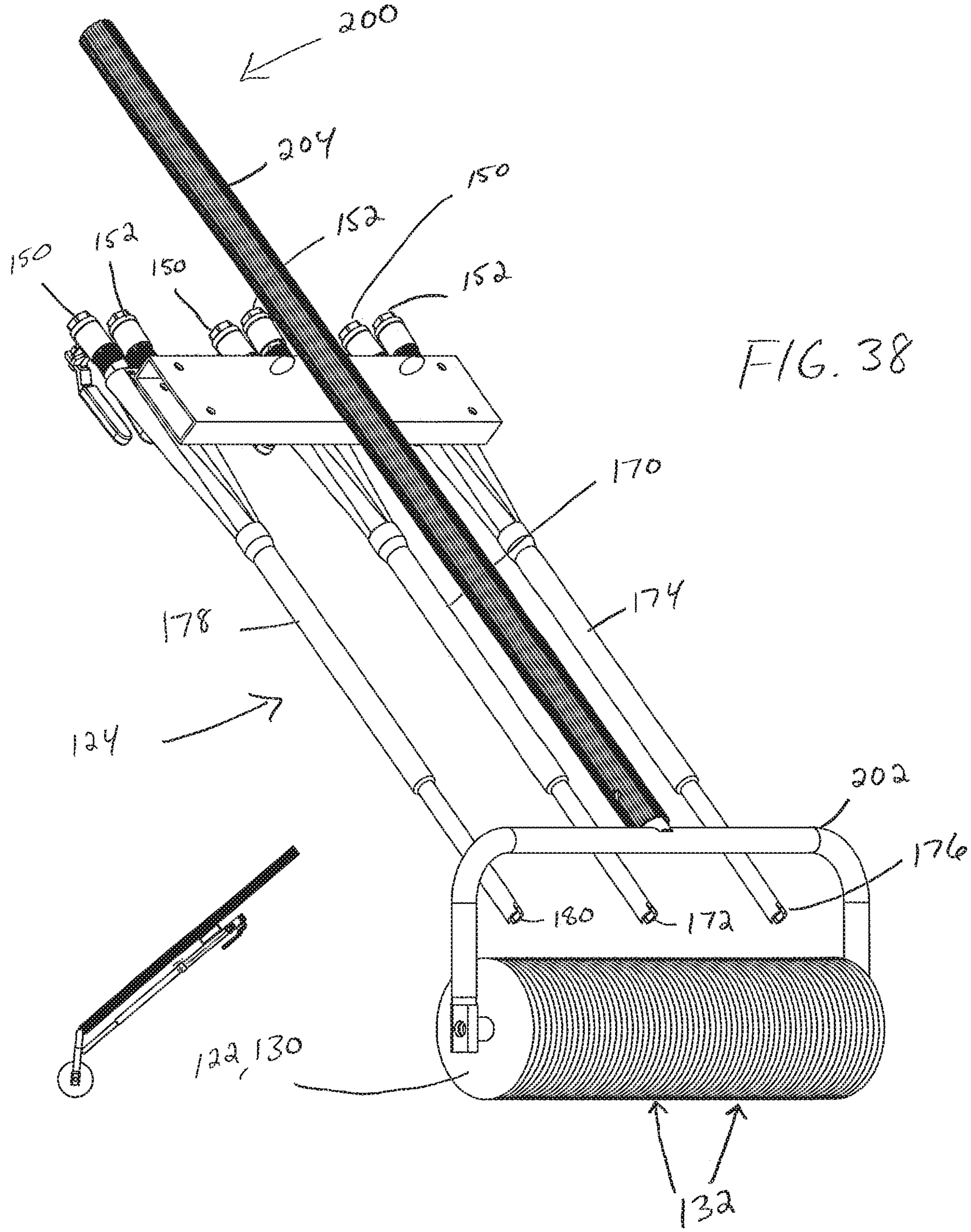
FIG. 38 is a perspective view of a fluid application system in accordance with an embodiment of the present disclosure.
Figure 40:
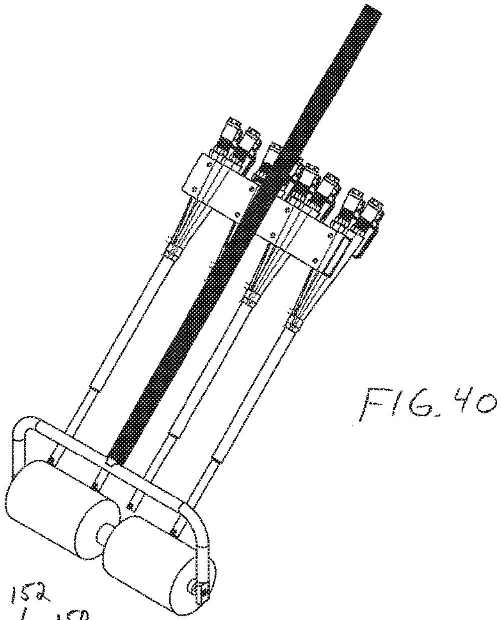
FIG. 40 is a perspective view of a fluid application system in accordance with an embodiment of the present disclosure.

Referring to FIG. 38, the first mixing portion 170, the second mixing portion 174, and the third mixing portion 178 are used with a fluid applicator 122 comprising a roller having notched portions 132.

Figure 39:
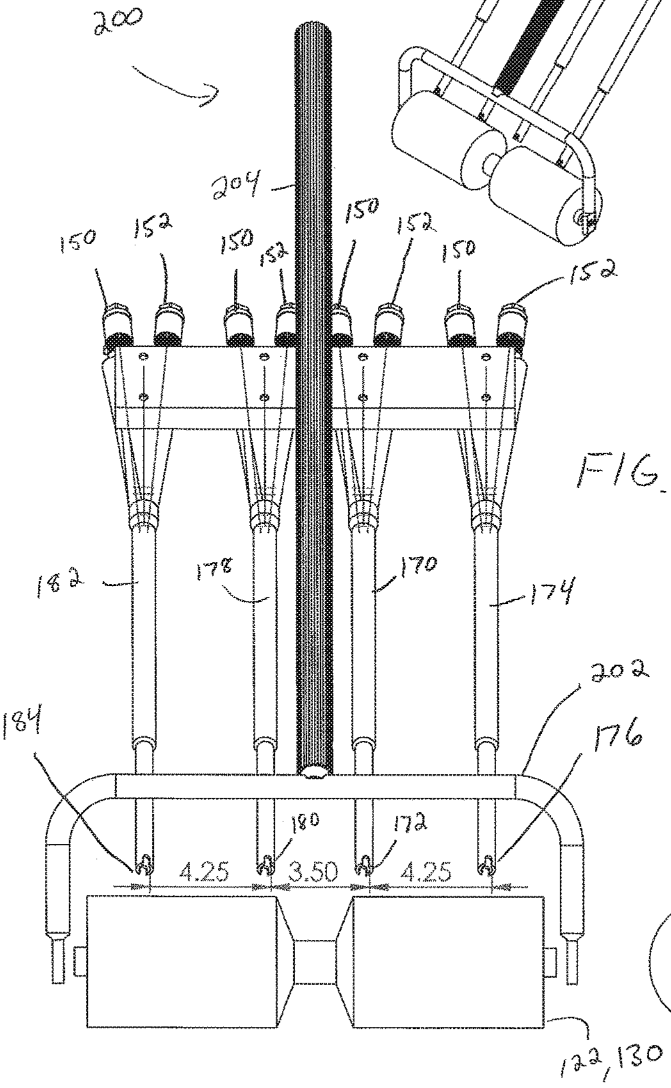
FIG. 39 is an elevation view of a fluid application system in accordance with another embodiment of the present disclosure exploded from a substrate.
Figure 41:
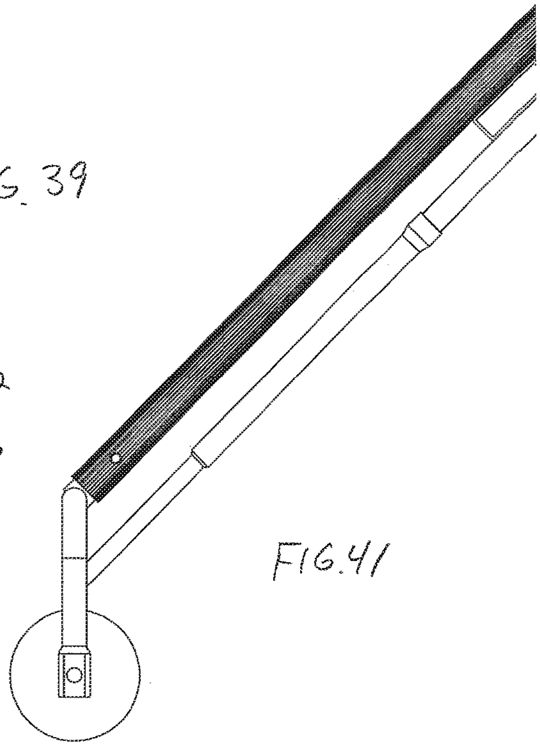
FIG. 41 is an elevation view of a fluid application system in accordance with an embodiment of the present disclosure exploded from a substrate.

Referring to FIG. 39, a fluid dispensing portion 124 also includes a fourth mixing portion 182 having a fourth mixing tip 184. In other embodiments, any number of mixing portions may be used for a desired application. The spacing between the mixing tips and the diameters of the apertures may vary as described in detail above in order to have a fluid dispensing portion of the present disclosure advantageously apply and supply an appropriate, sufficient, and consistent amount of a fluid F to all portions of a fluid applicator including all of the different contoured surfaces of the fluid applicator. By properly supplying a fluid F to a fluid applicator in this manner ensures that the fluid applicator then property coats a substrate with the desired fluid.

The fluid application system of the present disclosure offers many advantageous benefits over conventional systems. For example, the application of multiple component fluids is most commonly performed in a manner as described above where the materials are mixed in a pail and then applied by hand. Some multicomponent fluids are applied with a spray, but this requires personnel to be skilled in the art of two-component application precautions as well as being skilled in the operation of the special two component equipment pumps. When this skilled approach is in a controlled environment and the application is on a flat surface the process can be successful. However, when the project entails the added hazards of being elevated to a roof, attempting to coat a contoured surface while being wary of erratic winds, the task of spraying a two-component fluid is precarious. Wind driven two component fluids that have been atomized can damage buildings and cars as well as being extremely dangerous to humans. With all this uncertainty there remains a need to use a contoured fluid applicator which supplies streams of mixed fluid directly to a fluid applicator for application to a surface. The distances between the streams of mixed fluids are increased or decreased to correspond to the various contours of the fluid applicator which are adapted to the contours of the surfaces. In the present disclosure, by adapting the distances between static mixing tips, the corresponding streams exiting the mixing tips are aligned as required to meet the proper mill thickness coverage rates of a contoured surface. The present invention overcomes the challenges of prior art application methods.

Referring to FIGS. 42-43, in some embodiments, a fluid dispensing portion 124 of the present disclosure includes a wye outlet 190. In this manner, a first fluid and a second fluid can be mixed for distribution to contoured surfaces of a fluid applicator in the manner described herein.

The fluid application system of the present disclosure offers many advantageous benefits over conventional systems. For example, two component fluids flow into a static mixing chamber and then exit out of the chamber as a new mixed fluid. Subsequent to the mixing process the mixed fluid flows out of the mixing chamber and is then distributed through multiple apertures. This downstream distribution of the mixed fluid is accomplished by utilizing multiple apertures. The distance between the apertures is made to correspond to the contour of the fluid applicator which is adapted to the contours of the substrate. Accordingly, when the greatest rise in the contour of the applicator is located near the center of the applicator then the corresponding streams of fluid are also at this central area. As fluid flows onto the contours of the fluid applicator the streams form a rolling puddle in front of the applicator as it moves along the substrate. This rolling puddle contains enough fluid to adequately coat the entire width of the fluid applicator. This allows the puddle to feather out near the edges of the roller.

Because the streams are located so as to contact the angles of the contoured applicator the corresponding angles of the surfaces are sufficiently coated with the dual component material. Prior art methods of spraying or rolling have required the operator to rotate the application device so that each individual contour can be coated one at a time. Advantageously, the systems of the present invention allow all contours to be reached simultaneously.

While this disclosure has been described as having exemplar designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fluid application system for applying a fluid to a substrate, comprising:

a carrier;

a fluid applicator for applying the fluid to the substrate, the fluid applicator removably attachable to the carrier, the fluid applicator comprising a body; and a fluid dispensing portion for applying the fluid to the fluid applicator, the fluid dispensing portion removably attachable to the carrier, the fluid dispensing portion comprising:

a first mixing portion removably attachable to the carrier, wherein the first mixing portion receives a first part of the fluid and a second part of the fluid and mixes the first part and the second part theretogether;

a second mixing portion removably attachable to the carrier, wherein the second mixing portion receives the first part of the fluid and the second part of the fluid and mixes the first part and the second part theretogether; and a third mixing portion removably attachable to the carrier, wherein the third mixing portion receives the first part of the fluid and the second part of the fluid and mixes the first part and the second part theretogether, wherein the fluid dispensing portion applies the fluid having the first part and the second part mixed theretogether to the fluid applicator, and wherein the first mixing portion includes a first mixing tip, wherein the first mixing portion is configured to create a first mixed fluid, and wherein the first mixing tip is configured to apply the first mixed fluid to the fluid applicator.

2. The fluid application system of claim 1, wherein the second mixing portion includes a second mixing tip, wherein the second mixing portion is configured to create a second mixed fluid, and wherein the second mixing tip is configured to apply the second mixed fluid to the fluid applicator.

3. The fluid application system of claim 2, wherein the third mixing portion includes a third mixing tip, wherein the third mixing portion is configured to create a third mixed fluid, and wherein the third mixing tip is configured to apply the third mixed fluid to the fluid applicator.

4. The fluid application system of claim 3, wherein the first mixing portion comprises a first vee manifold.

5. The fluid application system of claim 4, wherein the second mixing portion comprises a second vee manifold.

6. The fluid application system of claim 5, wherein the third mixing portion comprises a third vee manifold.

7. A fluid application system for applying a first fluid and a second fluid to a substrate, comprising:

a carrier;

a fluid applicator for applying the first fluid and the second fluid to the substrate, the fluid applicator removably attachable to the carrier, the fluid applicator comprising a body; and a fluid dispensing portion for applying the first fluid and the second fluid to the fluid applicator, the fluid dispensing portion removably attachable to the carrier, the fluid dispensing portion comprising:

a first mixing portion removably attachable to the carrier, wherein the first mixing portion receives a first part of the first fluid and a second part of the first fluid and mixes the first part and the second part of the first fluid theretogether; and a second mixing portion removably attachable to the carrier, wherein the second mixing portion receives a first part of the second fluid and a second part of the second fluid and mixes the first part and the second part of the second fluid theretogether.

8. The fluid application system of claim 7, wherein the fluid dispensing portion applies the first part and the second part of the first fluid mixed theretogether and the first part and the second part of the second fluid mixed theretogether to the fluid applicator.

9. The fluid application system of claim 8, further comprising a third mixing portion removably attachable to the carrier, wherein the third mixing portion receives a first part of a third fluid and a second part of a third fluid and mixes the first part and the second part of the third fluid theretogether.

10. The fluid application system of claim 9, wherein the first mixing portion includes a first mixing tip, wherein the first mixing portion is configured to create a first mixed fluid, and wherein the first mixing tip is configured to apply the first mixed fluid to the fluid applicator.

11. The fluid application system of claim 10, wherein the second mixing portion includes a second mixing tip, wherein the second mixing portion is configured to create a second mixed fluid, and wherein the second mixing tip is configured to apply the second mixed fluid to the fluid applicator.

12. The fluid application system of claim 11, wherein the third mixing portion includes a third mixing tip, wherein the third mixing portion is configured to create a third mixed fluid, and wherein the third mixing tip is configured to apply the third mixed fluid to the fluid applicator.

13. The fluid application system of claim 12, wherein the first mixing portion comprises a first vee manifold.

14. The fluid application system of claim 13, wherein the second mixing portion comprises a second vee manifold.

15. The fluid application system of claim 14, wherein the third mixing portion comprises a third vee manifold.

* * * * *